United States Patent
Dewis et al.

(10) Patent No.: US 8,499,874 B2
(45) Date of Patent: Aug. 6, 2013

(54) GAS TURBINE ENERGY STORAGE AND CONVERSION SYSTEM

(75) Inventors: David William Dewis, North Hampton, NH (US); James Kesseli, Greenland, NH (US); Frank Wegner Donnelly, North Vancouver (CA); Thomas Wolf, Winchester, MA (US); Timothy Upton, Exeter, NH (US); John D. Watson, Evergreen, CO (US)

(73) Assignee: ICR Turbine Engine Corporation, Vancouver, British Columbia (CA)

( * ) Notice: Subject to any disclaimer, the term of this patent is extended or adjusted under 35 U.S.C. 154(b) by 240 days.

(21) Appl. No.: 12/777,916

(22) Filed: May 11, 2010

(65) Prior Publication Data

US 2010/0288571 A1 Nov. 18, 2010

Related U.S. Application Data

(60) Provisional application No. 61/177,493, filed on May 12, 2009, provisional application No. 61/327,988, filed on Apr. 26, 2010.

(51) Int. Cl.
*B60K 6/00* (2007.10)

(52) U.S. Cl.
USPC .................. 180/165; 180/65.265; 180/305

(58) Field of Classification Search
USPC .............. 180/165, 65.2, 65.3, 303, 304, 305, 180/306; 60/668, 659, 645, 618
See application file for complete search history.

(56) References Cited

U.S. PATENT DOCUMENTS

| | | | |
|---|---|---|---|
| 2,463,964 A | 3/1949 | Graf | |
| 2,543,677 A | 2/1951 | Traupel | |
| 2,696,711 A | 12/1954 | Marchant et al. | |
| 2,711,071 A | 6/1955 | Frankel | |
| 3,032,987 A | 5/1962 | Taylor | |
| 3,091,933 A | 6/1963 | Wagner et al. | |
| 3,166,902 A | 1/1965 | Maljanian et al. | |
| 3,209,536 A | 10/1965 | Howes et al. | |
| 3,518,472 A | 6/1970 | O'Callaghan | |
| 3,639,076 A | 2/1972 | Rowen | |
| 3,646,753 A | 3/1972 | Stearns et al. | |

(Continued)

FOREIGN PATENT DOCUMENTS

| | | |
|---|---|---|
| AT | 311027 | 12/2005 |
| AU | 582981 | 4/1989 |

(Continued)

OTHER PUBLICATIONS

International Search Report for International (PCT) Application No. PCT/US2010/034375, mailed Jul. 15, 2010.

(Continued)

*Primary Examiner* — J. Allen Shriver, II
*Assistant Examiner* — James Triggs
(74) *Attorney, Agent, or Firm* — Sheridan Ross P.C.

(57) ABSTRACT

The present invention combines the principles of a gas turbine engine with an electric transmission system. A method and apparatus are disclosed for utilizing metallic and ceramic elements to store heat energy derived from a regenerative braking system. The subject invention uses this regenerated electrical energy to provide additional energy storage over conventional electrical storage methods suitable for a gas turbine engine. The subject invention provides engine braking for a gas turbine engine as well as reducing fuel consumption.

15 Claims, 16 Drawing Sheets

U.S. PATENT DOCUMENTS

| | | | | |
|---|---|---|---|---|
| 3,660,977 | A | 5/1972 | Reynolds | |
| 3,706,203 | A | 12/1972 | Goldberg et al. | |
| 3,729,928 | A | 5/1973 | Rowen | |
| 3,748,491 | A | 7/1973 | Barrigher et al. | |
| 3,764,814 | A | 10/1973 | Griffith | |
| 3,766,732 | A | 10/1973 | Woodcock | |
| 3,817,343 | A | 6/1974 | Albrecht | |
| 3,848,636 | A | 11/1974 | McCombs | |
| 3,888,337 | A | 6/1975 | Worthen et al. | |
| 3,893,293 | A | 7/1975 | Moore | |
| 3,937,588 | A | 2/1976 | Kisslan | |
| 3,939,653 | A | 2/1976 | Schirmer | |
| 3,945,199 | A | 3/1976 | Bradley et al. | |
| 3,953,967 | A | 5/1976 | Smith | |
| 3,964,253 | A | 6/1976 | Paduch et al. | |
| 3,977,183 | A | 8/1976 | Stearns | |
| 3,986,364 | A | 10/1976 | Cronin et al. | |
| 3,986,575 | A * | 10/1976 | Eggmann | 180/302 |
| 3,999,373 | A | 12/1976 | Bell et al. | |
| 3,999,375 | A | 12/1976 | Smith et al. | |
| 4,002,058 | A | 1/1977 | Wolfinger | |
| 4,005,946 | A | 2/1977 | Brown et al. | |
| 4,027,472 | A | 6/1977 | Stearns | |
| 4,027,473 | A | 6/1977 | Baker | |
| 4,056,019 | A | 11/1977 | Ahlen | |
| 4,059,770 | A | 11/1977 | Mackay | |
| 4,082,115 | A | 4/1978 | Gibb et al. | |
| 4,122,668 | A | 10/1978 | Chou et al. | |
| 4,242,042 | A | 12/1980 | Schwarz | |
| 4,242,871 | A | 1/1981 | Breton | |
| 4,248,040 | A | 2/1981 | Kast | |
| 4,270,357 | A | 6/1981 | Rossi et al. | |
| 4,276,744 | A | 7/1981 | Pisano | |
| 4,277,938 | A | 7/1981 | Belke et al. | |
| 4,280,327 | A | 7/1981 | Mackay | |
| 4,282,948 | A * | 8/1981 | Jerome | 180/165 |
| 4,312,191 | A | 1/1982 | Biagini | |
| 4,336,856 | A | 6/1982 | Gamell | |
| 4,399,651 | A | 8/1983 | Geary et al. | |
| 4,411,595 | A | 10/1983 | Pisano | |
| 4,449,359 | A | 5/1984 | Cole et al. | |
| 4,467,607 | A | 8/1984 | Rydquist et al. | |
| 4,470,261 | A | 9/1984 | Kronogard et al. | |
| 4,474,007 | A | 10/1984 | Kronogard et al. | |
| 4,492,874 | A | 1/1985 | Near | |
| 4,494,372 | A | 1/1985 | Cronin | |
| 4,499,756 | A | 2/1985 | Medeiros et al. | |
| 4,754,607 | A | 7/1988 | Mackay | |
| 4,783,957 | A | 11/1988 | Harris | |
| 4,815,278 | A | 3/1989 | White | |
| 4,819,436 | A | 4/1989 | Ahner et al. | |
| 4,858,428 | A | 8/1989 | Paul | |
| 4,864,811 | A | 9/1989 | Pfefferle | |
| 5,010,729 | A | 4/1991 | Adamson et al. | |
| 5,036,267 | A | 7/1991 | Markunas et al. | |
| 5,069,032 | A | 12/1991 | White | |
| 5,081,832 | A | 1/1992 | Mowill | |
| 5,083,039 | A | 1/1992 | Richardson et al. | |
| 5,090,193 | A | 2/1992 | Schwarz et al. | |
| 5,097,658 | A | 3/1992 | Klaass et al. | |
| 5,113,669 | A | 5/1992 | Coffinberry | |
| 5,129,222 | A | 7/1992 | Lampe et al. | |
| 5,144,299 | A | 9/1992 | Smith | |
| 5,214,910 | A | 6/1993 | Adair | |
| 5,231,822 | A | 8/1993 | Shekleton | |
| 5,253,470 | A | 10/1993 | Newton | |
| 5,276,353 | A | 1/1994 | Kobayashi et al. | |
| 5,301,500 | A | 4/1994 | Hines | |
| 5,333,989 | A | 8/1994 | Missana et al. | |
| 5,343,692 | A | 9/1994 | Thomson et al. | |
| 5,349,814 | A | 9/1994 | Ciokajlo et al. | |
| 5,427,455 | A | 6/1995 | Bosley | |
| 5,448,889 | A | 9/1995 | Bronicki | |
| 5,497,615 | A | 3/1996 | Noe et al. | |
| 5,529,398 | A | 6/1996 | Bosley | |
| 5,549,174 | A * | 8/1996 | Reis | 180/165 |
| 5,555,719 | A | 9/1996 | Rowen et al. | |
| 5,586,429 | A | 12/1996 | Kesseli et al. | |
| 5,610,962 | A | 3/1997 | Solorzano et al. | |
| 5,685,156 | A | 11/1997 | Willis et al. | |
| 5,697,848 | A | 12/1997 | Bosley | |
| 5,722,259 | A | 3/1998 | Sorensen et al. | |
| 5,742,515 | A | 4/1998 | Runkle et al. | |
| 5,752,380 | A | 5/1998 | Bosley et al. | |
| 5,784,268 | A | 7/1998 | Steffek et al. | |
| 5,791,868 | A | 8/1998 | Bosley et al. | |
| 5,819,524 | A | 10/1998 | Bosley et al. | |
| 5,820,074 | A | 10/1998 | Trommer et al. | |
| 5,827,040 | A | 10/1998 | Bosley et al. | |
| 5,850,732 | A | 12/1998 | Willis et al. | |
| 5,850,733 | A | 12/1998 | Bosley et al. | |
| 5,873,235 | A | 2/1999 | Bosley et al. | |
| 5,894,720 | A | 4/1999 | Willis et al. | |
| 5,899,673 | A | 5/1999 | Bosley et al. | |
| 5,903,116 | A | 5/1999 | Geis et al. | |
| 5,915,841 | A | 6/1999 | Weissert | |
| 5,918,985 | A | 7/1999 | Bosley | |
| 5,928,301 | A | 7/1999 | Soga et al. | |
| 5,929,538 | A | 7/1999 | O'Sullivan et al. | |
| 5,954,174 | A | 9/1999 | Costin | |
| 5,964,663 | A | 10/1999 | Stewart et al. | |
| 5,966,926 | A | 10/1999 | Shekleton et al. | |
| 6,002,603 | A | 12/1999 | Carver | |
| 6,011,377 | A | 1/2000 | Heglund et al. | |
| 6,016,658 | A | 1/2000 | Willis et al. | |
| 6,020,713 | A | 2/2000 | Geis et al. | |
| 6,023,135 | A | 2/2000 | Gilbreth et al. | |
| 6,031,294 | A | 2/2000 | Geis et al. | |
| 6,037,687 | A | 3/2000 | Stewart et al. | |
| 6,049,195 | A | 4/2000 | Geis et al. | |
| 6,062,016 | A | 5/2000 | Edelman | |
| 6,065,281 | A | 5/2000 | Shekleton et al. | |
| 6,070,404 | A | 6/2000 | Bosley et al. | |
| 6,082,112 | A | 7/2000 | Shekleton | |
| 6,085,524 | A | 7/2000 | Persson | |
| 6,093,975 | A | 7/2000 | Peticolas | |
| 6,094,799 | A | 8/2000 | Stewart et al. | |
| 6,107,693 | A | 8/2000 | Mongia et al. | |
| 6,138,781 | A * | 10/2000 | Hakala | 180/2.2 |
| D433,997 | S | 11/2000 | Laituri et al. | |
| 6,141,953 | A | 11/2000 | Mongia et al. | |
| 6,155,076 | A | 12/2000 | Cullen et al. | |
| 6,155,780 | A | 12/2000 | Rouse | |
| 6,158,892 | A | 12/2000 | Stewart et al. | |
| 6,169,334 | B1 | 1/2001 | Edelman | |
| 6,170,251 | B1 | 1/2001 | Skowronski et al. | |
| 6,178,751 | B1 | 1/2001 | Shekleton et al. | |
| 6,190,048 | B1 | 2/2001 | Weissert | |
| 6,192,668 | B1 | 2/2001 | Mackay | |
| 6,194,794 | B1 | 2/2001 | Lampe et al. | |
| 6,205,765 | B1 | 3/2001 | Iasillo et al. | |
| 6,205,768 | B1 | 3/2001 | Dibble et al. | |
| 6,213,234 | B1 | 4/2001 | Rosen et al. | |
| 6,239,520 | B1 | 5/2001 | Stahl et al. | |
| 6,265,786 | B1 | 7/2001 | Bosley et al. | |
| 6,274,945 | B1 | 8/2001 | Gilbreth et al. | |
| 6,281,596 | B1 | 8/2001 | Gilbreth et al. | |
| 6,281,601 | B1 | 8/2001 | Edelman et al. | |
| 6,314,717 | B1 | 11/2001 | Teets et al. | |
| 6,316,841 | B1 | 11/2001 | Weber | |
| 6,324,828 | B1 | 12/2001 | Willis et al. | |
| 6,324,846 | B1 | 12/2001 | Clarke | |
| 6,325,142 | B1 | 12/2001 | Bosley et al. | |
| 6,349,787 | B1 * | 2/2002 | Dakhil | 180/302 |
| 6,355,987 | B1 | 3/2002 | Bixel | |
| 6,361,271 | B1 | 3/2002 | Bosley | |
| 6,381,944 | B2 | 5/2002 | Mackay | |
| 6,405,522 | B1 | 6/2002 | Pont et al. | |
| 6,410,992 | B1 | 6/2002 | Wall et al. | |
| 6,425,732 | B1 | 7/2002 | Rouse et al. | |
| 6,437,468 | B2 | 8/2002 | Stahl et al. | |
| 6,438,936 | B1 | 8/2002 | Ryan | |
| 6,438,937 | B1 | 8/2002 | Pont et al. | |
| 6,453,658 | B1 | 9/2002 | Willis et al. | |
| 6,468,051 | B2 | 10/2002 | Lampe et al. | |
| 6,487,096 | B1 | 11/2002 | Gilbreth et al. | |
| 6,489,692 | B1 | 12/2002 | Gilbreth et al. | |

| | | | | | | |
|---|---|---|---|---|---|---|
| 6,495,929 B2 | 12/2002 | Bosley et al. | 6,989,610 B2 | 1/2006 | Gupta et al. | |
| 6,499,949 B2 | 12/2002 | Schafrik et al. | 6,998,728 B2 | 2/2006 | Gupta et al. | |
| 6,522,030 B1 | 2/2003 | Wall et al. | 7,053,590 B2 | 5/2006 | Wang | |
| 6,526,757 B2 | 3/2003 | MacKay | 7,065,873 B2 | 6/2006 | Kang et al. | |
| 6,539,720 B2 | 4/2003 | Rouse et al. | RE39,190 E | 7/2006 | Weissert | |
| 6,543,232 B1 | 4/2003 | Anderson et al. | 7,092,262 B2 | 8/2006 | Ryan et al. | |
| 6,552,440 B2 | 4/2003 | Gilbreth et al. | 7,093,443 B2 | 8/2006 | McKelvey et al. | |
| 6,605,928 B2 | 8/2003 | Gupta et al. | 7,112,036 B2 | 9/2006 | Lubell et al. | |
| 6,606,864 B2 | 8/2003 | Mackay | 7,117,683 B2 | 10/2006 | Thompson | |
| 6,612,112 B2 | 9/2003 | Gilbreth et al. | 7,147,050 B2 | 12/2006 | Kang et al. | |
| 6,629,064 B1 | 9/2003 | Wall | 7,166,928 B2 | 1/2007 | Larsen | |
| 6,634,176 B2 | 10/2003 | Rouse et al. | 7,181,337 B2 | 2/2007 | Kosaka | |
| 6,639,328 B2 | 10/2003 | Wacknov | 7,185,496 B2 | 3/2007 | Herlihy | |
| 6,644,916 B1 | 11/2003 | Beacom | 7,186,200 B1 | 3/2007 | Hauser | |
| RE38,373 E | 12/2003 | Bosley | 7,211,906 B2 | 5/2007 | Teets et al. | |
| 6,657,332 B2 | 12/2003 | Balas | 7,224,081 B2 | 5/2007 | Larsen | |
| 6,657,348 B2 | 12/2003 | Qin et al. | 7,244,524 B2 | 7/2007 | McCluskey et al. | |
| 6,663,044 B1 | 12/2003 | Squier et al. | 7,266,429 B2 | 9/2007 | Travaly et al. | |
| 6,664,653 B1 | 12/2003 | Edelman | 7,285,871 B2 | 10/2007 | Derouineau | |
| 6,664,654 B2 | 12/2003 | Wall et al. | 7,299,638 B2 | 11/2007 | Mackay | |
| 6,675,583 B2 | 1/2004 | Willis et al. | 7,318,154 B2 | 1/2008 | Tehee | |
| 6,683,389 B2 | 1/2004 | Geis | 7,325,401 B1 * | 2/2008 | Kesseli et al. | 60/677 |
| 6,684,642 B2 | 2/2004 | Willis et al. | 7,343,744 B2 | 3/2008 | Abelson et al. | |
| 6,698,208 B2 | 3/2004 | Teets | 7,393,179 B1 | 7/2008 | Kesseli et al. | |
| 6,698,554 B2 | 3/2004 | Desta et al. | 7,398,642 B2 | 7/2008 | McQuiggan | |
| 6,702,463 B1 | 3/2004 | Brockett et al. | 7,404,294 B2 | 7/2008 | Sundin | |
| 6,709,243 B1 | 3/2004 | Tan et al. | 7,415,764 B2 | 8/2008 | Kang et al. | |
| 6,713,892 B2 | 3/2004 | Gilbreth et al. | 7,423,412 B2 | 9/2008 | Weng et al. | |
| 6,720,685 B2 | 4/2004 | Balas | 7,464,533 B2 | 12/2008 | Wollenweber | |
| 6,729,141 B2 | 5/2004 | Ingram | 7,513,120 B2 | 4/2009 | Kupratis | |
| 6,732,531 B2 | 5/2004 | Dickey | RE40,713 E | 5/2009 | Geis et al. | |
| 6,735,951 B2 | 5/2004 | Thompson | 7,572,531 B2 | 8/2009 | Forte | |
| 6,745,574 B1 | 6/2004 | Dettmer | 7,574,853 B2 | 8/2009 | Teets et al. | |
| 6,747,372 B2 | 6/2004 | Gilbreth et al. | 7,574,867 B2 | 8/2009 | Teets et al. | |
| 6,748,742 B2 | 6/2004 | Rouse et al. | 7,595,124 B2 | 9/2009 | Varatharajan et al. | |
| 6,751,941 B2 | 6/2004 | Edelman et al. | 7,605,487 B2 | 10/2009 | Barton et al. | |
| 6,766,647 B2 | 7/2004 | Hartzheim | 7,605,498 B2 | 10/2009 | Ledenev et al. | |
| 6,784,565 B2 | 8/2004 | Wall et al. | 7,607,318 B2 | 10/2009 | Lui et al. | |
| 6,787,933 B2 | 9/2004 | Claude et al. | 7,608,937 B1 | 10/2009 | Altenschulte | |
| 6,794,766 B2 | 9/2004 | Wickert et al. | 7,614,792 B2 | 11/2009 | Wade et al. | |
| 6,796,527 B1 | 9/2004 | Munoz et al. | 7,615,881 B2 | 11/2009 | Halsey et al. | |
| 6,804,946 B2 | 10/2004 | Willis et al. | 7,617,687 B2 | 11/2009 | West et al. | |
| 6,810,677 B2 | 11/2004 | Dewis | 7,656,135 B2 | 2/2010 | Schram et al. | |
| 6,812,586 B2 | 11/2004 | Wacknov et al. | 7,671,481 B2 | 3/2010 | Miller et al. | |
| 6,812,587 B2 | 11/2004 | Gilbreth et al. | 7,766,790 B2 | 8/2010 | Stevenson et al. | |
| 6,815,932 B2 | 11/2004 | Wall | 7,770,376 B1 | 8/2010 | Brostmeyer | |
| 6,817,575 B1 | 11/2004 | Munoz et al. | 7,777,358 B2 | 8/2010 | Halsey et al. | |
| 6,819,999 B2 | 11/2004 | Hartzheim | 7,804,184 B2 | 9/2010 | Yuan et al. | |
| 6,823,675 B2 | 11/2004 | Brunell et al. | 7,841,185 B2 | 11/2010 | Richards et al. | |
| 6,829,899 B2 | 12/2004 | Benham, Jr. et al. | 7,861,696 B2 | 1/2011 | Lund | |
| 6,832,470 B2 | 12/2004 | Dewis | 7,866,532 B1 | 1/2011 | Potter et al. | |
| 6,834,226 B2 | 12/2004 | Hartzheim | 7,921,944 B2 * | 4/2011 | Russell et al. | 180/65.265 |
| 6,836,720 B2 | 12/2004 | Hartzheim | 7,926,274 B2 * | 4/2011 | Farkaly | 60/670 |
| 6,837,419 B2 | 1/2005 | Ryan | 7,957,846 B2 | 6/2011 | Hakim et al. | |
| 6,845,558 B2 | 1/2005 | Beacom | 8,046,990 B2 * | 11/2011 | Bollinger et al. | 60/410 |
| 6,845,621 B2 | 1/2005 | Teets | 8,188,693 B2 * | 5/2012 | Wei et al. | 318/400.03 |
| 6,847,129 B2 | 1/2005 | McKelvey et al. | 2001/0030425 A1 | 10/2001 | Gilbreth et al. | |
| 6,847,194 B2 | 1/2005 | Sarlioglu et al. | 2001/0052704 A1 | 12/2001 | Bosley et al. | |
| 6,848,249 B2 * | 2/2005 | Coleman et al. ............. 60/39.17 | 2002/0054718 A1 | 5/2002 | Weissert | |
| 6,863,509 B2 | 3/2005 | Dewis | 2002/0063479 A1 | 5/2002 | Mitchell et al. | |
| 6,864,595 B2 | 3/2005 | Wall | 2002/0067872 A1 | 6/2002 | Weissert | |
| 6,870,279 B2 | 3/2005 | Gilbreth et al. | 2002/0073688 A1 | 6/2002 | Bosley et al. | |
| 6,877,323 B2 | 4/2005 | Dewis | 2002/0073713 A1 | 6/2002 | Mackay | |
| 6,883,331 B2 | 4/2005 | Jonsson et al. | 2002/0079760 A1 | 6/2002 | Vessa | |
| 6,888,263 B2 | 5/2005 | Satoh et al. | 2002/0083714 A1 | 7/2002 | Bakholdin | |
| 6,891,282 B2 | 5/2005 | Gupta et al. | 2002/0096393 A1 | 7/2002 | Rouse | |
| 6,895,760 B2 | 5/2005 | Kesseli | 2002/0096959 A1 | 7/2002 | Qin et al. | |
| 6,909,199 B2 | 6/2005 | Gupta et al. | 2002/0097928 A1 | 7/2002 | Swinton et al. | |
| 6,911,742 B2 | 6/2005 | Gupta et al. | 2002/0099476 A1 | 7/2002 | Hamrin et al. | |
| 6,931,856 B2 | 8/2005 | Belokon et al. | 2002/0103745 A1 | 8/2002 | Lof et al. | |
| 6,951,110 B2 | 10/2005 | Kang | 2002/0104316 A1 | 8/2002 | Dickey et al. | |
| 6,956,301 B2 | 10/2005 | Gupta et al. | 2002/0110450 A1 | 8/2002 | Swinton | |
| 6,958,550 B2 | 10/2005 | Gilbreth et al. | 2002/0119040 A1 | 8/2002 | Bosley | |
| 6,960,840 B2 | 11/2005 | Willis et al. | 2002/0120368 A1 | 8/2002 | Edelman et al. | |
| 6,964,168 B1 | 11/2005 | Pierson et al. | 2002/0124569 A1 | 9/2002 | Treece et al. | |
| 6,966,173 B2 | 11/2005 | Dewis | 2002/0128076 A1 | 9/2002 | Lubell | |
| 6,973,880 B2 * | 12/2005 | Kumar ............. 105/35 | 2002/0148229 A1 | 10/2002 | Pont et al. | |
| 6,977,446 B2 | 12/2005 | Mackay | 2002/0149205 A1 | 10/2002 | Gilbreth et al. | |
| 6,979,914 B2 | 12/2005 | McKelvey et al. | 2002/0149206 A1 | 10/2002 | Gilbreth et al. | |

| | | | | | |
|---|---|---|---|---|---|
| 2002/0157881 A1 | 10/2002 | Bakholdin et al. | CA | 1202099 | 3/1986 |
| 2002/0158517 A1 | 10/2002 | Rouse et al. | CA | 1244661 | 11/1988 |
| 2002/0166324 A1 | 11/2002 | Willis et al. | CA | 1275719 | 10/1990 |
| 2003/0110773 A1 | 6/2003 | Rouse et al. | CA | 2066258 | 3/1991 |
| 2004/0008010 A1 | 1/2004 | Ebrahim et al. | CA | 1286882 | 7/1991 |
| 2004/0011038 A1 | 1/2004 | Stinger et al. | CA | 2220172 | 5/1998 |
| 2004/0035656 A1 | 2/2004 | Anwar et al. | CA | 2234318 | 10/1998 |
| 2004/0080165 A1 | 4/2004 | Geis et al. | CA | 2238356 | 3/1999 |
| 2004/0090204 A1 | 5/2004 | McGinley | CA | 2242947 | 3/1999 |
| 2004/0103669 A1 | 6/2004 | Willis et al. | CA | 2246769 | 3/1999 |
| 2004/0106486 A1 | 6/2004 | Jonsson | CA | 2279320 | 4/2000 |
| 2004/0119291 A1 | 6/2004 | Hamrin et al. | CA | 2677758 | 4/2000 |
| 2004/0148942 A1 | 8/2004 | Pont et al. | CA | 2317855 | 5/2001 |
| 2004/0160061 A1 | 8/2004 | Rouse et al. | CA | 2254034 | 6/2007 |
| 2005/0000224 A1 | 1/2005 | Jonsson | CA | 2638648 | 2/2009 |
| 2005/0103931 A1 | 5/2005 | Morris et al. | CA | 2689188 | 7/2010 |
| 2005/0206331 A1 | 9/2005 | Donnelly | CH | 595552 | 2/1978 |
| 2005/0228553 A1* | 10/2005 | Tryon ............... 701/22 | CH | 679235 | 1/1992 |
| 2006/0076171 A1 | 4/2006 | Donnelly et al. | CN | 1052170 | 6/1991 |
| 2006/0090109 A1* | 4/2006 | Bonnet ............ 714/724 | CN | 1060270 | 4/1992 |
| 2007/0012129 A1 | 1/2007 | Maty et al. | CN | 1306603 | 8/2001 |
| 2007/0068712 A1* | 3/2007 | Carnahan ............ 180/65.2 | CN | 1317634 | 10/2001 |
| 2007/0178340 A1 | 8/2007 | Eickhoff | CN | 1902389 | 1/2007 |
| 2007/0181294 A1 | 8/2007 | Soldner et al. | CN | 101098079 | 1/2008 |
| 2007/0239325 A1 | 10/2007 | Regunath | CN | 100564811 | 12/2009 |
| 2007/0290039 A1 | 12/2007 | Pfleging et al. | CN | 101635449 | 1/2010 |
| 2008/0080682 A1 | 4/2008 | Ogunwale et al. | CN | 101672252 | 3/2010 |
| 2008/0148708 A1 | 6/2008 | Chou et al. | CS | 9101996 | 1/1992 |
| 2008/0197705 A1 | 8/2008 | Dewis et al. | CZ | 20014556 | 4/2003 |
| 2009/0045292 A1 | 2/2009 | Maddali et al. | DE | 1272306 | 7/1968 |
| 2009/0071478 A1 | 3/2009 | Kalfon | DE | 2753673 | 6/1978 |
| 2009/0090109 A1 | 4/2009 | Mills et al. | DE | 2853919 | 6/1979 |
| 2009/0106978 A1 | 4/2009 | Wollenweber | DE | 3140694 | 7/1982 |
| 2009/0109022 A1 | 4/2009 | Gangopadhyay et al. | DE | 3736984 | 5/1988 |
| 2009/0158739 A1 | 6/2009 | Messmer | DE | 69519684 | 8/2001 |
| 2009/0211260 A1 | 8/2009 | Kesseli et al. | DE | 10305352 | 9/2004 |
| 2009/0211739 A1 | 8/2009 | Nash et al. | DE | 69828916 | 3/2006 |
| 2009/0211740 A1 | 8/2009 | Kesseli et al. | DE | 60125441 | 2/2007 |
| 2009/0249786 A1 | 10/2009 | Garrett et al. | DE | 60125583 | 2/2007 |
| 2009/0271086 A1 | 10/2009 | Morris et al. | DK | 331889 | 7/1989 |
| 2009/0292436 A1 | 11/2009 | D'Amato et al. | EP | 0092551 | 11/1983 |
| 2009/0313990 A1 | 12/2009 | Mustafa | EP | 0093118 | 11/1983 |
| 2010/0021284 A1 | 1/2010 | Watson et al. | EP | 0104921 | 4/1984 |
| 2010/0052425 A1 | 3/2010 | Moore et al. | EP | 0157794 | 10/1985 |
| 2010/0154380 A1 | 6/2010 | Tangirala et al. | EP | 0377292 | 7/1990 |
| 2010/0229525 A1 | 9/2010 | Mackay et al. | EP | 0319246 | 10/1990 |
| 2010/0288571 A1* | 11/2010 | Dewis et al. ............... 180/165 | EP | 0432753 | 6/1991 |
| 2010/0293946 A1 | 11/2010 | Vick | EP | 0455640 | 11/1991 |
| 2010/0319355 A1 | 12/2010 | Prabhu | EP | 0472294 | 2/1992 |
| 2011/0020108 A1 | 1/2011 | Axelsson et al. | EP | 0478713 | 4/1992 |
| 2011/0100777 A1 | 5/2011 | Wilton et al. | EP | 0493481 | 7/1992 |
| 2011/0215640 A1 | 9/2011 | Donnelly | EP | 0522832 | 1/1993 |
| 2011/0288738 A1 | 11/2011 | Donnelly et al. | EP | 0620906 | 10/1994 |
| 2011/0295453 A1* | 12/2011 | Betz et al. ............... 701/22 | EP | 0691511 | 1/1996 |
| 2012/0000204 A1 | 1/2012 | Kesseli et al. | EP | 0754142 | 1/1997 |
| 2012/0017598 A1 | 1/2012 | Kesseli et al. | EP | 0784156 | 12/1997 |
| 2012/0042656 A1 | 2/2012 | Donnelly et al. | EP | 0837224 | 4/1998 |
| 2012/0096869 A1 | 4/2012 | Kesseli et al. | EP | 0837231 | 4/1998 |
| 2012/0102911 A1 | 5/2012 | Dewis et al. | EP | 0901218 | 3/1999 |
| 2012/0175886 A1 | 7/2012 | Donnelly et al. | EP | 0698178 | 6/1999 |
| 2012/0201657 A1 | 8/2012 | Donnelly et al. | EP | 0963035 | 12/1999 |
| 2012/0260662 A1 | 10/2012 | Nash et al. | EP | 1055809 | 11/2000 |
| 2012/0324903 A1 | 12/2012 | Dewis et al. | EP | 1075724 | 2/2001 |
| | | | EP | 1046786 | 1/2002 |
| | FOREIGN PATENT DOCUMENTS | | EP | 1071185 | 1/2002 |
| AU | 587266 | 8/1989 | EP | 1215393 | 6/2002 |
| AU | 8517301 | 3/2002 | EP | 0739087 | 8/2002 |
| AU | 2025002 | 5/2002 | EP | 1240713 | 9/2002 |
| AU | 2589802 | 5/2002 | EP | 1277267 | 1/2003 |
| AU | 2004203836 | 3/2005 | EP | 1283166 | 2/2003 |
| AU | 2004208656 | 2/2009 | EP | 1305210 | 5/2003 |
| AU | 2004318142 | 6/2009 | EP | 1340301 | 9/2003 |
| CA | 1050637 | 3/1979 | EP | 1340304 | 9/2003 |
| CA | 1068492 | 12/1979 | EP | 1341990 | 9/2003 |
| CA | 1098997 | 4/1981 | EP | 1342044 | 9/2003 |
| CA | 1099373 | 4/1981 | EP | 1346139 | 9/2003 |
| CA | 1133263 | 10/1982 | EP | 1436504 | 7/2004 |
| CA | 1171671 | 7/1984 | EP | 1203866 | 8/2004 |
| CA | 1190050 | 7/1985 | EP | 0800616 | 12/2004 |

| | | | | | |
|---|---|---|---|---|---|
| EP | 1519011 | 3/2005 | GB | 2074254 | 10/1981 |
| EP | 1132614 | 1/2007 | GB | 2089433 | 6/1982 |
| EP | 1790568 | 5/2007 | GB | 2123154 | 1/1984 |
| EP | 1813807 | 8/2007 | GB | 2174824 | 11/1986 |
| EP | 1825115 | 8/2007 | GB | 2184609 | 6/1987 |
| EP | 1860750 | 11/2007 | GB | 2199083 | 6/1988 |
| EP | 1939396 | 7/2008 | GB | 2211285 | 6/1989 |
| EP | 2028104 | 2/2009 | GB | 2218255 | 11/1989 |
| EP | 1638184 | 3/2009 | GB | 2232207 | 12/1990 |
| EP | 1648096 | 7/2009 | GB | 2341897 | 3/2000 |
| EP | 2108828 | 10/2009 | GB | 2355286 | 4/2001 |
| EP | 1728990 | 11/2009 | GB | 2420615 | 5/2006 |
| EP | 2161444 | 3/2010 | GB | 2426043 | 11/2006 |
| EP | 2169800 | 3/2010 | GB | 2435529 | 8/2007 |
| EP | 1713141 | 5/2010 | GB | 2436708 | 10/2007 |
| EP | 1728304 | 6/2010 | GB | 2441924 | 3/2008 |
| EP | 1468180 | 7/2010 | GB | 2442585 | 4/2008 |
| FR | 2467286 | 11/1985 | GB | 2456336 | 7/2009 |
| FR | 2637942 | 4/1990 | GB | 2456672 | 7/2009 |
| FR | 2645908 | 10/1990 | GB | 2447514 | 12/2009 |
| FR | 2755319 | 4/1998 | IN | 4946DELNP2006 | 8/2007 |
| FR | 2848647 | 6/2004 | IN | 4341DELNP2005 | 10/2007 |
| GB | 612817 | 11/1948 | IN | 5879DELNP2008 | 9/2008 |
| GB | 671379 | 5/1952 | IN | 2502DEL2005 | 10/2009 |
| GB | 673961 | 6/1952 | IN | 1913DEL2009 | 6/2010 |
| GB | 706743 | 4/1954 | IN | 55DEL2010 | 7/2010 |
| GB | 731735 | 6/1955 | IN | 2013DEL2009 | 7/2010 |
| GB | 761955 | 11/1956 | IT | 1173399 | 6/1987 |
| GB | 768047 | 2/1957 | IT | 1194590 | 9/1988 |
| GB | 784119 | 10/1957 | IT | MI911564 | 1/1992 |
| GB | 786001 | 11/1957 | JP | 51-065252 | 6/1976 |
| GB | 789589 | 1/1958 | JP | 56-088920 | 7/1981 |
| GB | 807267 | 1/1959 | JP | 56-148624 | 11/1981 |
| GB | 817507 | 7/1959 | JP | 56-148625 | 11/1981 |
| GB | 834550 | 5/1960 | JP | 60-184973 | 9/1985 |
| GB | 864712 | 4/1961 | JP | 61-182489 | 8/1986 |
| GB | 874251 | 8/1961 | JP | 3182638 | 8/1991 |
| GB | 877838 | 9/1961 | JP | 6201891 | 7/1994 |
| GB | 878552 | 10/1961 | JP | 2519620 | 7/1996 |
| GB | 885184 | 12/1961 | JP | 10-054561 | 2/1998 |
| GB | 917392 | 2/1963 | JP | 10-061660 | 3/1998 |
| GB | 919540 | 2/1963 | JP | 10-115229 | 5/1998 |
| GB | 920408 | 3/1963 | JP | 10-122180 | 5/1998 |
| GB | 924078 | 4/1963 | JP | 11-324727 | 11/1999 |
| GB | 931926 | 7/1963 | JP | 2000-054855 | 2/2000 |
| GB | 937278 | 9/1963 | JP | 2000-130319 | 5/2000 |
| GB | 937681 | 9/1963 | JP | 2000-329096 | 11/2000 |
| GB | 950015 | 2/1964 | JP | 2002-030942 | 1/2002 |
| GB | 950506 | 2/1964 | JP | 2002-115565 | 4/2002 |
| GB | 977402 | 12/1964 | JP | 2003-009593 | 1/2003 |
| GB | 993039 | 5/1965 | JP | 2003-013744 | 1/2003 |
| GB | 1004953 | 9/1965 | JP | 2003-041906 | 2/2003 |
| GB | 1008310 | 10/1965 | JP | 2004-163087 | 6/2004 |
| GB | 1009115 | 11/1965 | JP | 2005-345095 | 12/2005 |
| GB | 1012909 | 12/1965 | JP | 2006-022811 | 1/2006 |
| GB | 1043271 | 9/1966 | JP | 2006-170208 | 6/2006 |
| GB | 1083943 | 9/1967 | JP | 2006-174694 | 6/2006 |
| GB | 1097623 | 1/1968 | JP | 2006-200438 | 8/2006 |
| GB | 1103032 | 2/1968 | JP | 2007-231949 | 9/2007 |
| GB | 1127856 | 9/1968 | JP | 2008-111438 | 5/2008 |
| GB | 1137691 | 12/1968 | JP | 2008-132973 | 6/2008 |
| GB | 1138807 | 1/1969 | JP | 2009-108756 | 5/2009 |
| GB | 1141019 | 1/1969 | JP | 2009-108860 | 5/2009 |
| GB | 1148179 | 4/1969 | JP | 2009-209931 | 9/2009 |
| GB | 1158271 | 7/1969 | JP | 2009-216085 | 9/2009 |
| GB | 1172126 | 11/1969 | JP | 2009-250040 | 10/2009 |
| GB | 1174207 | 12/1969 | JP | 2010-014114 | 1/2010 |
| GB | 1211607 | 11/1970 | JP | 2010-106835 | 5/2010 |
| GB | 1270011 | 4/1972 | KR | 19840002483 | 12/1984 |
| GB | 1275753 | 5/1972 | KR | 880002362 | 10/1988 |
| GB | 1275754 | 5/1972 | KR | 890001170 | 4/1989 |
| GB | 1275755 | 5/1972 | KR | 1020010007189 | 1/2001 |
| GB | 1301104 | 12/1972 | KR | 1020020024545 | 3/2002 |
| GB | 1348797 | 3/1974 | KR | 1020030032864 | 4/2003 |
| GB | 1392271 | 4/1975 | KR | 1020060096320 | 9/2006 |
| GB | 1454766 | 11/1976 | KR | 1020070078978 | 8/2007 |
| GB | 1460590 | 1/1977 | KR | 1020070113990 | 11/2007 |
| GB | 1516664 | 7/1978 | KR | 1020080033866 | 4/2008 |
| GB | 2019494 | 10/1979 | KR | 1020090121248 | 11/2009 |

| | | |
|---|---|---|
| NL | 7903120 | 10/1979 |
| SE | 437543 | 3/1985 |
| SE | 9901718 | 5/1999 |
| SE | 0103180 | 3/2003 |
| WO | WO 8501326 | 3/1985 |
| WO | WO 9207221 | 4/1992 |
| WO | WO 9524072 | 9/1995 |
| WO | WO 9722176 | 6/1997 |
| WO | WO 9722789 | 6/1997 |
| WO | WO 9726491 | 7/1997 |
| WO | WO 9825014 | 6/1998 |
| WO | WO 9854448 | 12/1998 |
| WO | WO 9919161 | 4/1999 |
| WO | WO 0140644 | 6/2001 |
| WO | WO 0182448 | 11/2001 |
| WO | WO 0202920 | 1/2002 |
| WO | WO 0240844 | 5/2002 |
| WO | WO 0242611 | 5/2002 |
| WO | WO 0244574 | 6/2002 |
| WO | WO 0250618 | 6/2002 |
| WO | WO 0237638 | 9/2002 |
| WO | WO 0229225 | 2/2003 |
| WO | WO 0239045 | 2/2003 |
| WO | WO 03093652 | 6/2004 |
| WO | WO 2004077637 | 9/2004 |
| WO | WO 2005045345 | 5/2005 |
| WO | WO 2005099063 | 10/2005 |
| WO | WO 2008044972 | 4/2008 |
| WO | WO 2008044973 | 4/2008 |
| WO | WO 2008082334 | 7/2008 |
| WO | WO 2008082335 | 7/2008 |
| WO | WO 2008082336 | 7/2008 |
| WO | WO 2009067048 | 5/2009 |
| WO | WO 2010050856 | 5/2010 |
| WO | WO 2010082893 | 7/2010 |
| ZA | 8608745 | 7/1987 |

OTHER PUBLICATIONS

Written Opinion for International (PCT) Application No. PCT/US2010/034375, mailed Jul. 15, 2010.

"A High-Efficiency ICR Microturbine for Commercial Vehicle Propulsion," PACCAR, date unknown, 11 pages.

"Analysis of Technology Options to Reduce the Fuel Consumption of Idling Trucks," Stodolsky, F., L. Gaines, and A. Vyas, Argonne National Laboratory, ANL/ESD-43, Jun. 2000, 40 pages.

"Benefits of the Microturbine to Power the Next Generation of Trucks." Kenworth Truck Company, date unknown, 9 pages.

"Why Gas Turbines have a Future in Heavy Duty Trucks." Capstone Turbine Corporation, Brayton Energy, LLC, Kenworth Truck Company, a PACCAR Company, Peterbilt Truck Company, a PACCAR Company, Apr. 2009, 10 pages.

Balogh et al. "DC Link Floating for Grid Connected PV Converters," World Academy of Science, Engineering and Technology Apr. 2008, Iss. 40, pp. 115-120.

Mackay et al. "High Efficiency Vehicular Gas Turbines," SAE International, 2005, 10 pages.

Nemeth et al. "Life Predicted in a Probabilistic Design Space for Brittle Materials With Transient Loads," NASA, last updated Jul. 21, 2005, found at http://www.grc.nasa.gov/WWW/RT/2004/RS/RS06L-nemeth.html, 5 pages.

Wolf et al. "Preliminary Design and Projected Performance for Intercooled-Recuperated Microturbine," Proceedings of the ASME TurboExpo 2008 Microturbine and Small Turbomachinery Systems, Jun. 9-13, 2008, Berlin, Germany, 10 pages.

* cited by examiner

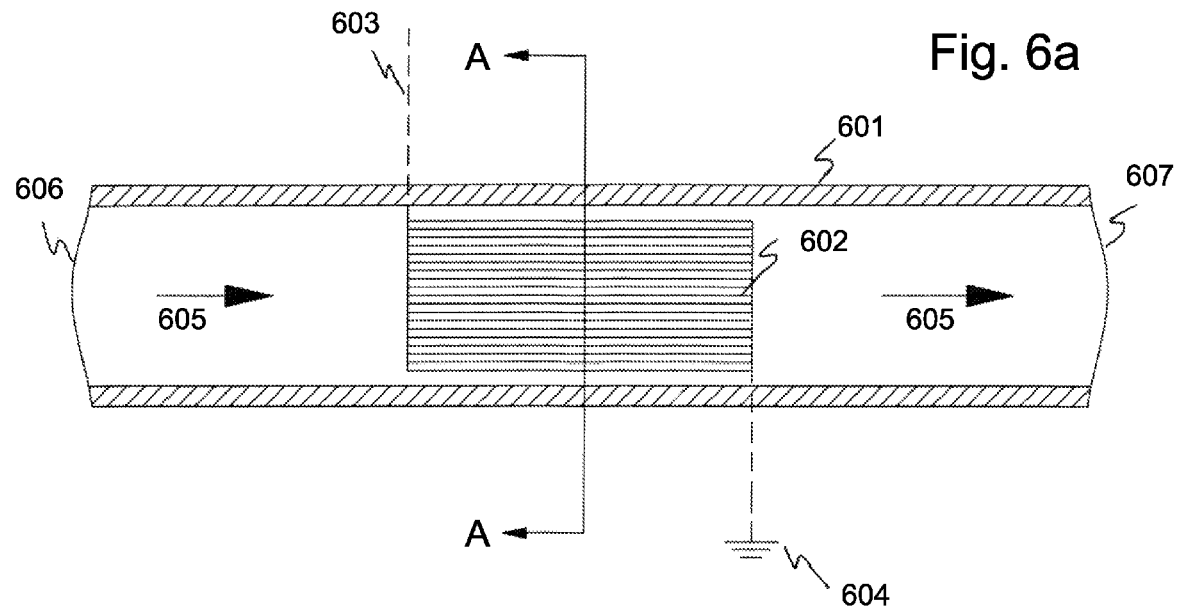
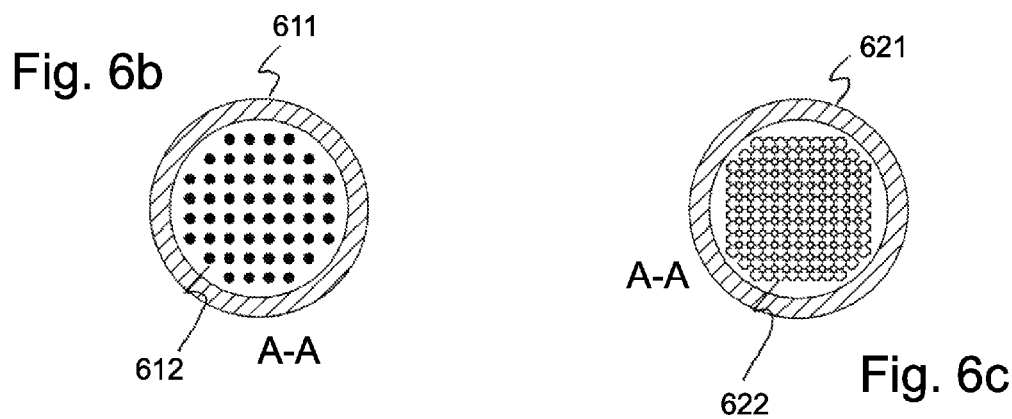
Figure 6

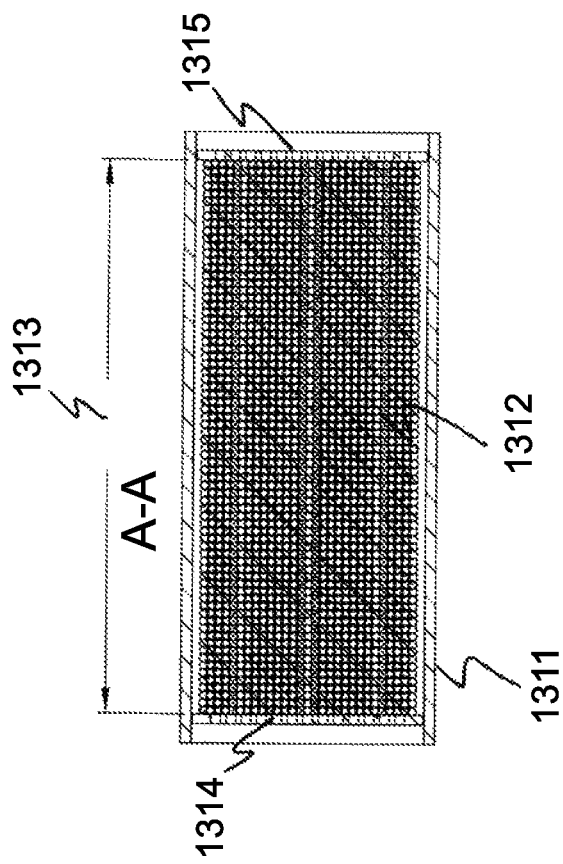
Fig. 13 b
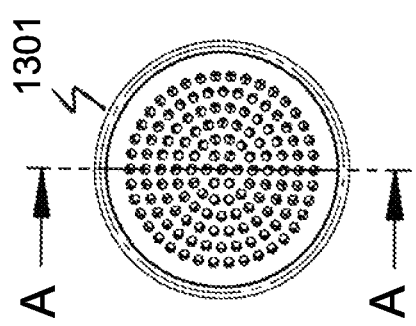
Fig. 13a
Figure 13

GAS TURBINE ENERGY STORAGE AND CONVERSION SYSTEM

CROSS REFERENCE TO RELATED APPLICATION

The present application claims the benefits, under 35 U.S.C. §119(e), of U.S. Provisional Application Ser. No. 61/177,493 entitled "Gas Turbine Energy Storage and Conversion System", filed May 12, 2009 and Provisional Application Ser. No. 61/327,988 entitled "Gas Turbine Energy Storage and Conversion System", filed Apr. 26, 2010, each of which is incorporated herein by this reference.

FIELD

The present invention relates generally to the field of regenerative braking and energy storage in gas turbine engines.

BACKGROUND

The world requires ever-increasing amounts of fuel for vehicle propulsion. Means of utilizing fuels needs to be accomplished more efficiently and with substantially lower carbon dioxide emissions and other air pollutants such as NOxs.

The gas turbine or Brayton cycle power plant has demonstrated many attractive features which make it a candidate for advanced vehicular propulsion. However, the gas turbine does not allow the normal "engine braking" or "compression braking" feature that is extensively used in piston-type engines. Further, many modern regenerative braking systems rely on batteries or other electrical storage subsystems to receive and absorb excess braking energy (others utilize pneumatic or hydraulic storage). In most cases, the cost of this energy storage is significant. Sizing a typical battery or ultracapacitor energy storage system to absorb energy at high power associated with a long down-hill decent, for example, is prohibitively expensive.

Gas turbine engines have the additional advantage of being highly fuel flexible and fuel tolerant. For example, gas turbines can be operated on a variety of fuels such as diesel, gasoline, ethanol, methanol, natural gas, biofuels and hydrogen. The performance of gas turbine engines can be improved by making use of electrical energy recovered by a regenerative braking system. These improvements may include extending component lifetimes, pre-heating of fuels and providing an engine braking capability analogous to the Jacobs brake used by piston engines.

There remains a need for compact thermal energy storage devices to better enable gas turbine engines to recover energy from braking so as to improve both engine and braking performance of these engines applied to vehicular propulsion.

SUMMARY

These and other needs are addressed by the present invention. In one embodiment, the present invention is directed to a gas turbine engine that uses high temperature materials such as ceramic and/or metallic elements to store heat energy derived from a regenerative braking capability. The embodiment combines the principles of a gas turbine or Brayton cycle engine with an electric or hybrid transmission system. New techniques of thermal energy storage and thermal energy manipulation that can recover substantial amounts of energy normally discarded in braking are disclosed.

In one configuration of the embodiment, a method is provided that includes the steps of:
(a) receiving electrical energy from a regenerative braking system;
(b) converting at least a portion of the received electrical energy into thermal energy;
(c) transferring, directly and/or indirectly, the thermal energy to a pressurized working fluid to form a heated pressurized working fluid; and
(d) introducing the heated pressurized working fluid into at least one turbine to propel a vehicle.

In another configuration, a turbine power plant is provided that includes:
(a) a source of compressed fluid;
(b) a turbine;
(c) a mechanical linkage for extracting power from an output shaft of the turbine; and
(d) a sensible thermal storage and/or thermal transfer medium contained within a pressure boundary of the turbine power plant, wherein the sensible thermal storage and/or thermal transfer medium transfers, by convection, thermal energy to the compressed fluid.

In another configuration, a turbine power plant is provided that includes:
(a) a turbine power plant;
(b) a mechanical-to-electrical conversion device in mechanical communication with the turbine power plant to generate electrical energy from braking of the vehicle;
(c) a direct current ("DC") bus in electrical communication with the mechanical-to-electrical conversion device to receive the electrical energy; and
(d) at least one of a sensible thermal storage and/or thermal transfer medium In another configuration, a vehicle is provided that includes:
(a) a mechanical-to-electrical conversion device in mechanical communication with an output shaft plant to generate electrical energy from braking of the vehicle;
(b) a thermal energy storage medium to convert at least a portion of the electrical energy into thermal energy and store the thermal energy for use by a vehicle operation; an electrical energy storage system for storing at least a portion of the electrical energy; and
(c) a controller to regulate, based on at least one of a state-of-charge of the electrical energy storage system and a temperature of the thermal energy storage and transfer medium, an amount of electrical energy sent to each of the thermal energy storage and transfer medium and electrical energy storage medium.

In another configuration, a vehicle is provided that includes:
(a) a conduit for transporting a gas-fuel mixture;
(b) at least one of a combustor and re-heater for receiving and combusting the gas-fuel mixture to form a heated gas;
(c) a turbine to receive the heated gas from the at least one of a combustor and re-heater;
(d) an electrical storage system to store electrical energy;
(e) at least one of a sensible thermal storage and/or thermal transfer medium contained within a pressure boundary of the turbine power plant to receive the electrical energy from the electrical energy storage system to heat at least one of the gas and gas-fuel mixture; and
(f) a controller operable to direct transfer of electrical energy from the electrical energy storage system to the at least one of a sensible thermal storage and/or thermal transfer medium.

The application of gas turbines to vehicular propulsion demands a wide range of power production from the engine. Further, improved driving economies are derived from recovering energy normally lost in braking. In some cases, associated with long down-hill decent, the engine can be configured to absorb considerable energy, so as to prevent the excessive load on other braking systems.

An electric drive-train uses electric traction motors to drive the wheels. During braking the flow of power reverses as the wheels drive the traction motors, thereby generating electricity derived from the energy of braking (referred to commonly as regenerative braking). This principal is prior art and may be incorporated into a vehicle with either an Otto cycle, Diesel cycle, Brayton (gas turbine) cycle, or any propulsion power plant. Embodiments of the subject invention use this regenerated electricity in a manner that provides economic advantages over normal battery or other electrical storage methods, which are typically charge-rate and capacity limited.

Embodiments of the present invention are referred to herein as thermal energy storage modules and incorporate one or more electric resistor/heat storage elements located within the engine's fluid conduit and pressure boundary to absorb over-flow braking energy from an electrical generator that is typically part of an electric or hybrid transmission. The electric resistor element converts electrical energy by resistive or Joule heating and delivers thermal energy to gas turbine's air flow during normal driving. These electric resistor elements may be located, for example, upstream of combustor, in the combustor, upstream of the free power turbine, upstream of the hot side of a recuperator, or any combination of these locations. Residual thermal energy remaining after braking or stopping may be used to assist combustor relight or ignition.

The following definitions are used herein:

The terms "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Dynamic braking is implemented when the electric propulsion motors are switched to generator mode during braking to augment the braking force. The electrical energy generated is typically dissipated in a resistance grid system. If the electrical energy generated is recaptured and stored in an electrical energy storage system, dynamic braking is then typically referred to as regenerative braking.

An energy storage system refers to any apparatus that acquires, stores and distributes mechanical, electrical or thermal energy which is produced from another energy source such as a prime energy source, a regenerative braking system, a third rail and a catenary and any external source of electrical energy. Examples are a heat block, a battery pack, a bank of capacitors, a compressed air storage system and a bank of flywheels or a combination of storage systems.

An engine refers to any device that uses energy to develop mechanical power, such as motion in some other machine. Examples are diesel engines, gas turbine engines, microturbines, Stirling engines and spark ignition engines.

A gear box as used herein is a housing that includes at least one gear set.

A gear set as used herein is a single ratio gear assembly.

A heat block is a solid volume of material with a high heat capacity and high melting temperature to which heat can be added by electrical resistive or inductive heating and from which heat can be extracted by heat transfer to a fluid.

A hybrid vehicle combines an energy storage system, a prime power unit, and a vehicle propulsion system. A parallel hybrid vehicle is configured so that propulsive power can be provided by the prime power source only, the energy storage source only, or both. In a series hybrid vehicle, propulsive power is provided by the energy storage unit only and the prime power source is used to supply energy to the energy storage unit. When the energy storage capacity is small and the prime power source is large, the hybrid may be referred to as a power-assist hybrid. For example, an electric drive may be used primarily for starting and power assist while an internal combustion engine used primarily for propulsion. These vehicles are typically parallel hybrids. In a dual-mode hybrid, the energy storage and prime power are approximately balanced. For example, a dual-mode hybrid can operate on electric drive only, on engine power only, or on a combination of both. These vehicles are typically parallel hybrids.

Jake brake or Jacobs brake describes a particular brand of engine braking system. It is used generically to refer to engine brakes or compression release engine brakes in general, especially on large vehicles or heavy equipment. An engine brake is a braking system used primarily on semi-trucks or other large vehicles that modifies engine valve operation to use engine compression to slow the vehicle. They are also known as compression release engine brakes.

A mechanical-to-electrical energy conversion device refers to an apparatus that converts mechanical energy to electrical energy or electrical energy to mechanical energy. Examples include but are not limited to a synchronous alternator such as a wound rotor alternator or a permanent magnet machine, an asynchronous alternator such as an induction alternator, a DC generator, and a switched reluctance generator. A traction motor is a mechanical-to-electrical energy conversion device used primarily for propulsion.

Module as used herein in conjunction with a computer refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

A permanent magnet motor is a synchronous rotating electric machine where the stator is a three phase stator like that of an induction motor and the rotor has surface-mounted permanent magnets. In this respect, the permanent magnet synchronous motor is equivalent to an induction motor where the air gap magnetic field is produced by a permanent magnet. The use of a permanent magnet to generate a substantial air gap magnetic flux makes it possible to design highly efficient motors. For a common 3-phase permanent magnet synchronous motor, a standard 3-phase power stage is used. The power stage utilizes six power transistors with independent switching. The power transistors are switched in ways to allow the motor to generate power, to be free-wheeling or to act as a generator by controlling pulse frequency or pulse width.

A prime power source refers to any device that uses energy to develop mechanical or electrical power, such as motion in some other machine. Examples are diesel engines, gas turbine engines, microturbines, Stirling engines, spark ignition engines and fuel cells.

Power density as used herein is power per unit volume (watts per cubic meter).

A range-extended hybrid has a large energy storage capacity and a small prime power source. An example would be an electric drive vehicle with a small engine used for charging an electrical energy storage unit. These vehicles are typically series hybrids.

A recuperator is a heat exchanger that transfers heat through a network of tubes, a network of ducts or walls of a matrix wherein the flow on the hot side of the heat exchanger is typically exhaust gas and the flow on cold side of the heat exchanger is typically a gas such as air entering the combustion chamber. The flow of heat is from the hot side of the recuperator to the cold side of the recuperator.

Regenerative braking is the same as dynamic braking except the electrical energy generated is recaptured and stored in an energy storage system for future use.

Specific power as used herein is power per unit mass (watts per kilogram).

Spool means a group of turbo machinery components on a common shaft.

A thermal energy storage module is a device that includes either a metallic heat storage element or a ceramic heat storage element with embedded electrically conductive wires. A thermal energy storage module is similar to a heat storage block but is typically smaller in size and energy storage capacity.

A traction motor is a motor used primarily for propulsion such as commonly used in a locomotive. Examples are an AC or DC induction motor, a permanent magnet motor and a switched reluctance motor.

A turbine is any machine in which mechanical work is extracted from a moving fluid by expanding the fluid from a higher pressure to a lower pressure.

A vehicle is any device, apparatus or system for carrying, conveying, or otherwise transporting animate and/or inanimate objects, such as persons, including without limitation land conveyances (such as cars, trucks, buses, trains, and the like), maritime and other types of water vessels (such as ships, boats, and other watercraft), and aircraft.

BRIEF DESCRIPTION OF THE DRAWINGS

FIG. 6a is a sectional view of an electrically heated thermal energy storage module representation.

FIG. 6b is a first sectional view of the energy storage module representation taken along line A-A of FIG. 6a.

FIG. 6c is a second sectional view of the energy storage module representation taken along line A-A of FIG. 6a.

FIG. 13 shows an end view of the thermal energy storage module of FIG. 12.

FIG. 13b is a sectional view along line A-A of FIG. 13a of the thermal energy storage module representation of FIG. 13a.

DETAILED DESCRIPTION

Heat Energy Storage

Figure 1:
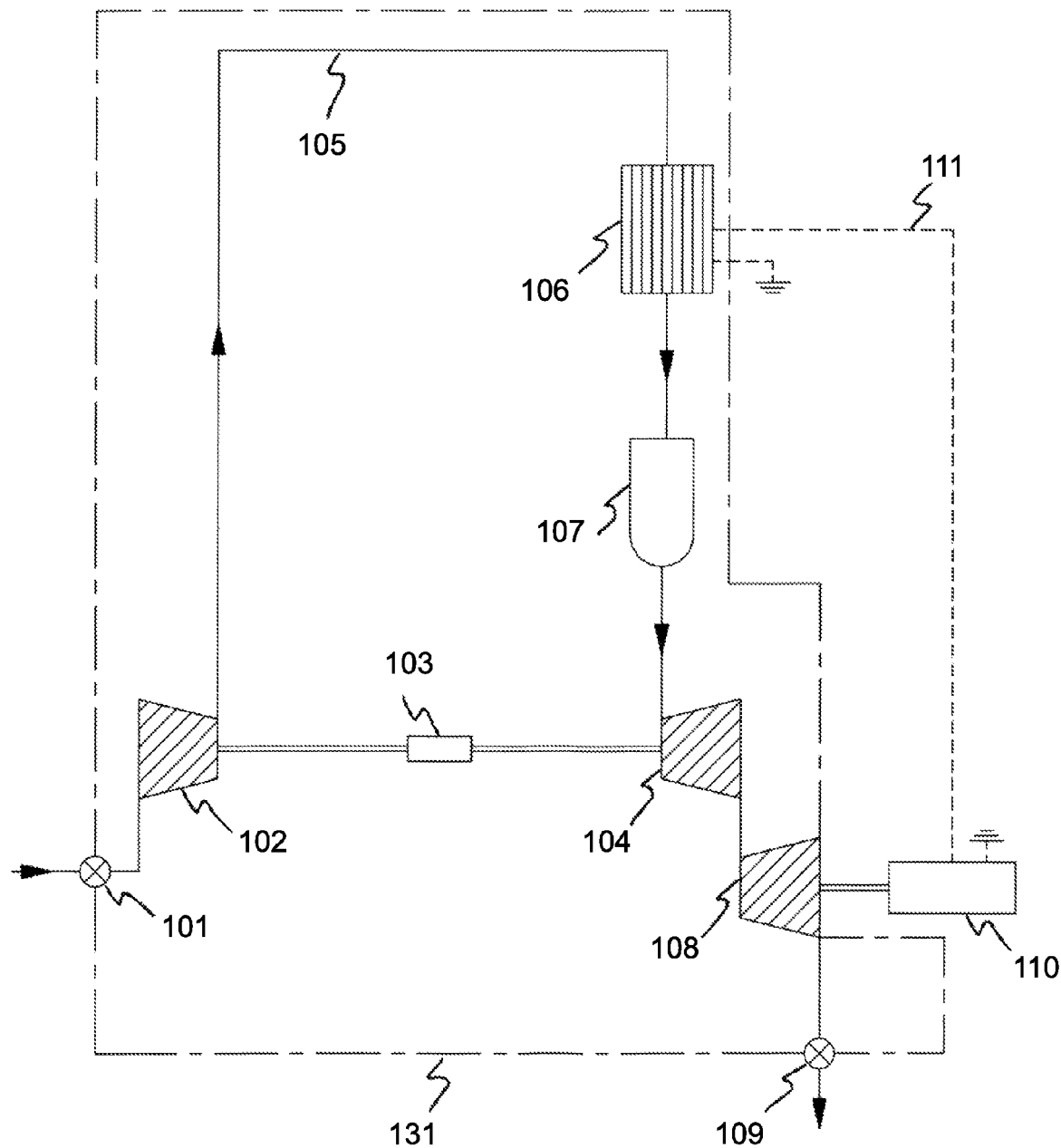
FIG. 1 is a schematic of a simple cycle gas turbine with electrically heated resistor bank integrated within the engine conduit.

Heat energy storage technology is known. For example, this technology has been proposed for non-nuclear submarines allowing them to operate for several hours to days while underwater. One of these technologies is the use of a graphite heat block as a heat source for a closed-cycle gas turbine power plant. In particular, the use of a graphite block heated to 2,750 K in an induction furnace to provide energy in place of a combustor has been disclosed. An inert gas flows through the block, picks up heat, spins the turbine and returns to complete the loop.

The energy storage possible with this technology is substantially higher than other forms of energy storage and, in particular, is compatible with gas turbines as a source of supplementary energy derived, for example, from regenerative braking.

Capacitors, inductors, some batteries and flywheels can release their energy at very high rates but typically at the expense of energy storage capacity. Graphite at high temperatures has a specific energy capacity comparable to chemical explosives and is a very compact form of energy storage compared to capacitors, inductors, flywheels and batteries commonly used in regenerative braking energy storage systems. Typical specific energy capacities associated with several energy storage technologies are shown in Table 1 below.

TABLE 1

Specific Energy Capacities of Some Storage Technologies

| Energy Storage Technology | Maximum Specific Energy Capacity (MJ/kg) |
| --- | --- |
| Capacitors | 0.0004 to 0.001 |
| Inductors - Room Temperature | 0.001 |
| Inductors - Cryogenic | 0.003 |
| Homopolar Generator (flywheel) | 0.0085 |
| Energy Storage Batteries | 0.2 |
| Kanthal Heat Storage at 1,700 K | 0.4 |
| Graphite Heat Block at 1,500 K | 2.0 |
| Graphite Heat Block at 2,000 K | 3.0 |
| Chemical Explosive (Octol) | 4.8 |

Some Thermal Properties of Heat Storage Materials

The properties of carbon and other materials such as ceramics make them useful for the collection and storage of thermal energy. These properties include: (1) a high heat capacity, especially at elevated temperatures; (2) a high melting point; and (3) a high thermal conductivity.

Preferred heat storage materials, for example, have a density of at least about 1,800 kg/m$^3$, even more preferably of at least about 3,500 kg/m$^3$, and even more preferably ranging from about 1,800 to about 7,500 kg/m$^3$; and a heat capacity of at least about 400 J/kg-K, even more preferably of at least about 700 J/kg-K, and even more preferably ranging from about 400 to about 1,700 J/kg-K. The material should provide a high heat transfer efficiency. Preferably, the ratio of the thermal power transferred to the working fluid to the electrical power generated by regenerative braking is at least about 0.20 and even more preferably ranges from about 0.30 to about 0.70. This ratio is a function of working fluid flow velocity and density, surface area of the material, its thermal conductivity and its electrical resistivity The material preferably has a thermal conductivity of at least about 5 W/m-K, more preferably of at least about 10 W/m-K, and even more preferably of at least about 20 W/m-K. Additionally, a preferred heat storage material also has a melting temperature in excess of the maximum temperature in the combustor (usually the combustor outlet temperature), even more preferably at least about 120% of the maximum temperature in the combustor, and even more preferably at least about 150% of the maximum temperature in the combustor.

A number of suitable materials, such as graphite, boron nitride, boron carbide, silicon carbide, silicon dioxide, magnesium oxide, tungsten carbide and alumina can be used for heat storage. Some important properties of ceramics and other high heat capacity materials that are typically used for gas turbine components are shown in Table 2 below.

TABLE 2

Some Properties of Heat Energy Storage Materials

| | Alumina | Cordierite | Silicon Carbide | Silicon Nitride | Graphite | Boron Nitride | Kanthal | Mullite |
|---|---|---|---|---|---|---|---|---|
| Density (kg/m3) | 3,700–3,970 | 2,600 | 3,210 | 3,310 | 2,250 | 1,900 | 7,100 | 2,800 |
| Specific Heat (J/kg-K) | 670 | 1,465 | 628 | 712 | 712 | 1,610 | 460 | 963 |
| Thermal Conductivity (W/m-K) | 24 | 3 | 41 | 27 | 24 | 30 | 11 | 3.5 |
| Coefficient Thermal Expansion (μm/m/K) | 8.39 | 1.7 | 5.12 | 3.14 | — | — | — | 5.3 |
| Thermal Shock Resistance ΔT (K) | 200–250 | 500 | 350–500 | 750 | — | — | — | 300 |
| Maximum Use Temperature (K) | 2,060 | 1,640 | 1,670 | 1,770 | 2,270 | 2,100 | 1,670 | 2,000 |

High working temperature metals are required for electrical conduits embedded in ceramics and other non-conducting heat storage materials. Such electrical conductors may be formed from tungsten wire, for example.

Other high working temperature metals may be used both for electrical conduits and for heat storage. The material used is required to be a high temperature, oxidation resistant, electrically conductive alloy. Currently available candidate materials include the Kanthal alloys (specifically Kanthal A1, APM and Kanthal AF). It would also be possible to use one of the Inconel (nickel-chromium) alloys, but their high-temperature/oxidation resistance is lower than that of the Kanthal alloys. Due to lower cost per unit weight and possible lower thermal cycle degradation leading to longer component life, it appears Kanthal A1 is a preferable choice.

Additionally, when the heat storage material also converts electrical energy into thermal energy (for example, Kanthal or Inconel alloys), the material should have an appropriate electrical resistivity. Preferably, the electrical resistivity is at least about $0.1 \times 10^{-6}$ ohm-meters, even more preferably at least about $0.5 \times 10^{-6}$ ohm-meters.

The properties of Kanthal A1 (and Kanthal APM) are density of about 7,100 kg/cu m, heat capacity of about 460 J/kg-K, thermal conductivity of about 13 W/m-K. The practical maximum continuous operating temperature for Kanthal A1 (and Kanthal AF) is about 1,670 K. In operation, a Kanthal heat storage module of the present invention would be cycled between a low temperature of about 780 K (discharged) up to a fully charged temperature for short periods of about 1,700 K.

Present Invention

The present invention integrates one or more electrical resistance heater elements into the gas turbine engine, receiving the regenerated electrical power and converting it to thermal storage and then to energy of the gas turbine's working fluid. The electrical heater is located within the engine's fluid conduit and pressure boundary, thereby eliminating the need for secondary transport fluids and facilitating the transport of the power through the engine's structural casing. FIG. 1 is a schematic representation of this basic principal for a single stage gas turbine engine. Compressor 102 pressurizes the engine working fluid, typically air or a lean air-fuel mixture. Conduit 105 is employed to transport the fluid to an electrically heated thermal storage module 106, combustor 109 and turbine 104. The conduits, such as conduit 105, connecting the various components are denoted by solid lines. A free power turbine 108 is connected to a drive train 110 which includes gear assemblies, electrical generator/motors, drive shafts, differentials and axles. Drive train 110 transmits mechanical or electrical propulsion power while motoring and generates electrical power while braking. Examples of these drive trains configured as electrical transmissions are described in FIGS. 4 and 5. In this embodiment, the electrical power generated within drive train 110 while braking is carried by conductor 111 (denoted by dashed lines) and passes through pressure boundary 131 (denoted by dot-dash lines) using a low resistance connector, well-known as an electrical feed-through. Within the high-pressure gas stream of the gas turbine, the electrical current causes Joule heating to occur in resistive element 106. This resistive heating element 106 may be fabricated from metallic wire or ceramic materials in which conductive wires are embedded. The temperature of heating element 106 will rise as electrical energy is delivered and absorbed. During periods of power demand from the engine, the absorbed thermal energy is convected to the gas turbine working fluid to offset energy that would otherwise be required from the fuel burned in the down-stream combustor 109. In the example of FIG. 1, the electrical power is delivered to the resistively heated thermal storage module 106 from an electrical generator, located somewhere within drive train 110, which derives its power from regenerative braking.

Figure 2:
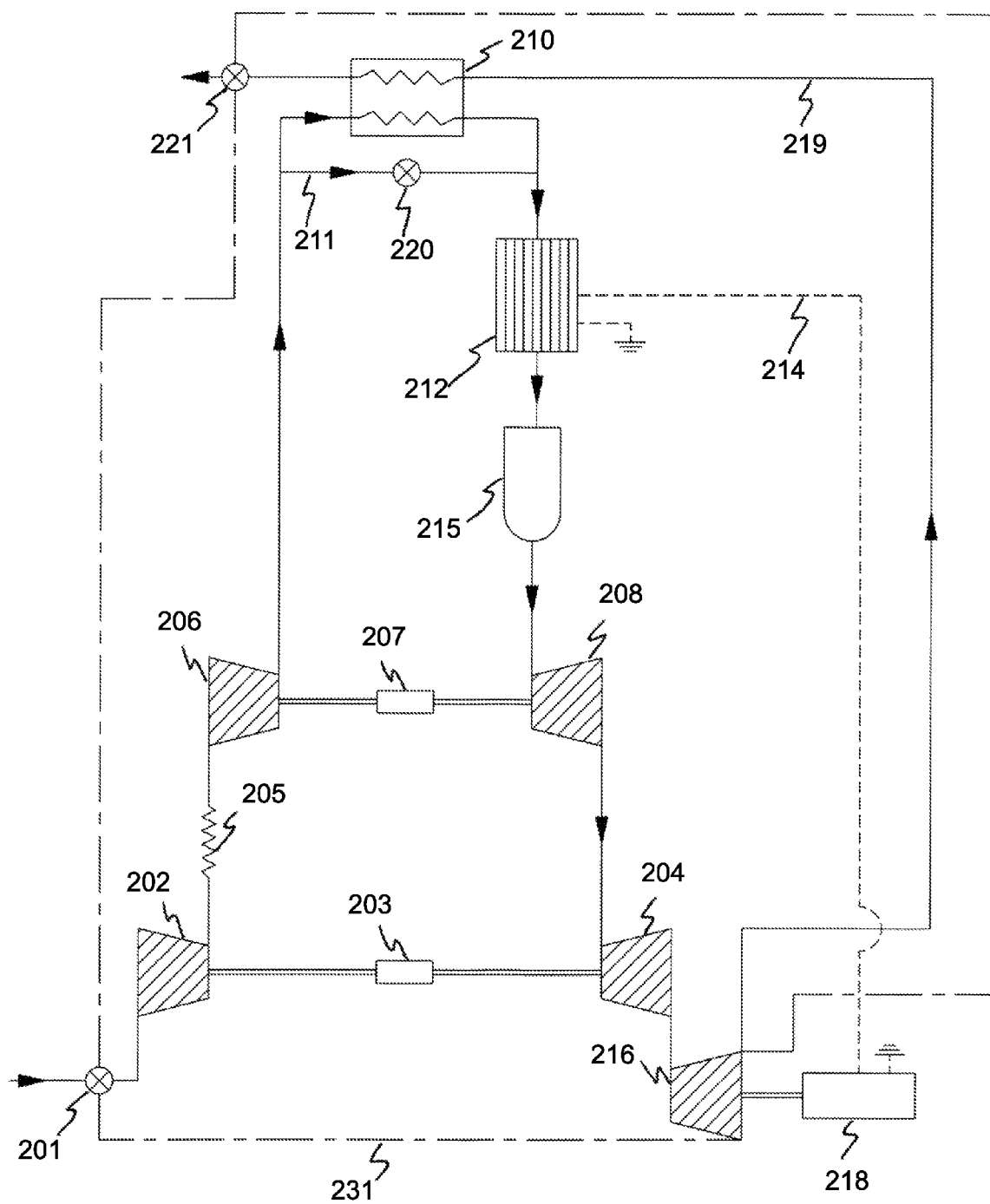
FIG. 2 is a schematic of an intercooled recuperated gas turbine with bypass around recuperator to increase thermal capacity of resistively heated thermal storage.

FIG. 2 shows a schematic of an intercooled recuperated Brayton cycle gas turbine. As in FIG. 1, conduits, such as conduit 219, connecting the various components are denoted by solid lines, the electrical conductors, such as conductor 214, are denoted by dashed lines and the pressure boundary 231 is denoted by dot-dash lines. This figure shows an intercooled, recuperated gas turbine engine which is comprised of a low pressure compressor 202, an intercooler 205, a high pressure compressor 206, a recuperator 210, a thermal storage module 212, a combustor 215, a high pressure turbine 208, a low pressure turbine 204, a free power turbine 216 which is connected to drive train 218 which includes gear assemblies, electrical generator/motors, drive shafts, differentials and axles. Drive train 110 transmits mechanical or electrical propulsion power while motoring and electrical power generation while braking. Examples of these drive trains configured as electrical transmissions are described in FIGS. 4 and 5. A regenerative braking system within drive train 218 delivers electrical to a heat energy storage module 212. In typical operating mode, inlet air, which may be controlled by a valve such as 201, is compressed by low pressure compressor 202, then cooled at approximately constant pressure in intercooler 205, compressed by high pressure compressor 206 to approximately maximum working pressure. The inlet air is heated by passing through recuperator 210 and heat storage module 212 and then heated to full working temperature by fuel energy added in combustor 215. The hot, high pressure working fluid then expands in high pressure turbine 208 powering high pressure compressor 206 via mechanical coupling 207, further expands in low pressure turbine 204 powering low pressure compressor 202 via mechanical coupling 203 and finally expanding in free power turbine 216 delivering mechanical shaft power to drive train 218. The exhaust gases are then passed through the hot side of recuperator 210 giving up heat energy to the inlet air passing through the cool side of recuperator 210 before being vented to the atmosphere possibly by a valve 221. Fuel is added to the air flow just upstream of or in combustor 215. In certain types of ceramic matrix combustors, gaseous or vaporized fuels may be injected with the inlet air.

When the vehicle brakes, transmission 218 is disengaged and a mechanical to electrical conversion device within drive train 218 is engaged to generate electrical energy via conductors 213 where it is converted to heat energy by Joule heating within the resistive elements in thermal storage module 212. A portion or all of the compressed inlet air heated by recuperator 210 can now be passed through thermal storage module 212 to gain further energy and temperature at approximately constant pressure before being delivered to combustor 215. If the air entering combustor 215 is at the desired temperature or temperature set point for the combustor exit, no fuel need be added. If the injected air is at a lower temperature than the desired temperature or temperature set point for the combustor exit, an appropriate amount of fuel is added. As can be appreciated, when heat is added to the combustor inlet air via thermal storage module 212, less fuel is required by combustor 215 than without the regenerative braking capability.

Depending on the duty cycle of the vehicle, the regenerative braking system described herein can have a modest or a large effect on the overall efficiency of the gas turbine. For example, a delivery van or bus normally has a duty cycle with many stops and starts and so a regenerative braking system could substantially increase overall fuel efficiency. On the other hand, a long-haul Class 8 semi-trailer truck may have a duty cycle with few stops and starts. However, a regenerative braking system would provide some increase overall fuel efficiency by capturing energy from downhill travel or the occasional stop and go traffic conditions. Additionally, as discussed below, this system of regenerative braking can also assist the truck's normal braking system as serve the function of a Jacob's brake for a gas turbine engine.

As can be appreciated, when no energy is being added to the thermal energy storage module, the temperature of the thermal element will tend to follow the flow temperature and so may have an effect, for example, on combustor outlet temperature. A temperature sensor located just upstream of the combustor can be used to affect small adjustments in fuel-air ration to compensate for this effect. It should also be noted that a battery or other electrical energy storage device may be used to heat the thermal storage element to assist in engine start-up. That is, a thermal energy storage element, located for example just upstream of the combustor, can be used to add heat to the working fluid to assist an engine starter device for a gas turbine engine used in a vehicle.

As explained in FIG. 1, an electrically heated resistor bank thermal storage module 212 is integrated into the engine circuit upstream of combustor 215, configured to receive regenerated electricity and pre-heat gas on route to combustor 215. A recuperator 210 significantly improves the engine conversion efficiency, relative to the simple gas turbine cycle shown in FIG. 1, by recovering thermal energy from the free power (last stage) turbine duct to pre-heat the combustion gas. When employing a recuperator, the thermodynamic availability of energy from the electrically heated resistor and thermal storage module is reduced in proportion to the increased gas inlet temperature. To increase the energy absorbing capacity of the thermal storage module 212 during extended periods of regenerative braking (such as for example, a long decent), a simple by-pass duct 211 controlled by a solenoid valve 220 may be activated to introduce cool air over the resistor elements. This recuperator bypass allows for increased power dissipation from the thermal storage module by rapidly dropping combustor inlet temp. Although less preferred, a thermal storage module may be located in by-pass duct 211.

It should be obvious to one skilled in the art of gas turbine architecture that the subject invention applies to gas turbines with and without intercooling, single shaft mechanical configurations, free-power turbine configurations, and varying numbers of compressor and turbine stages.

Figure 3:
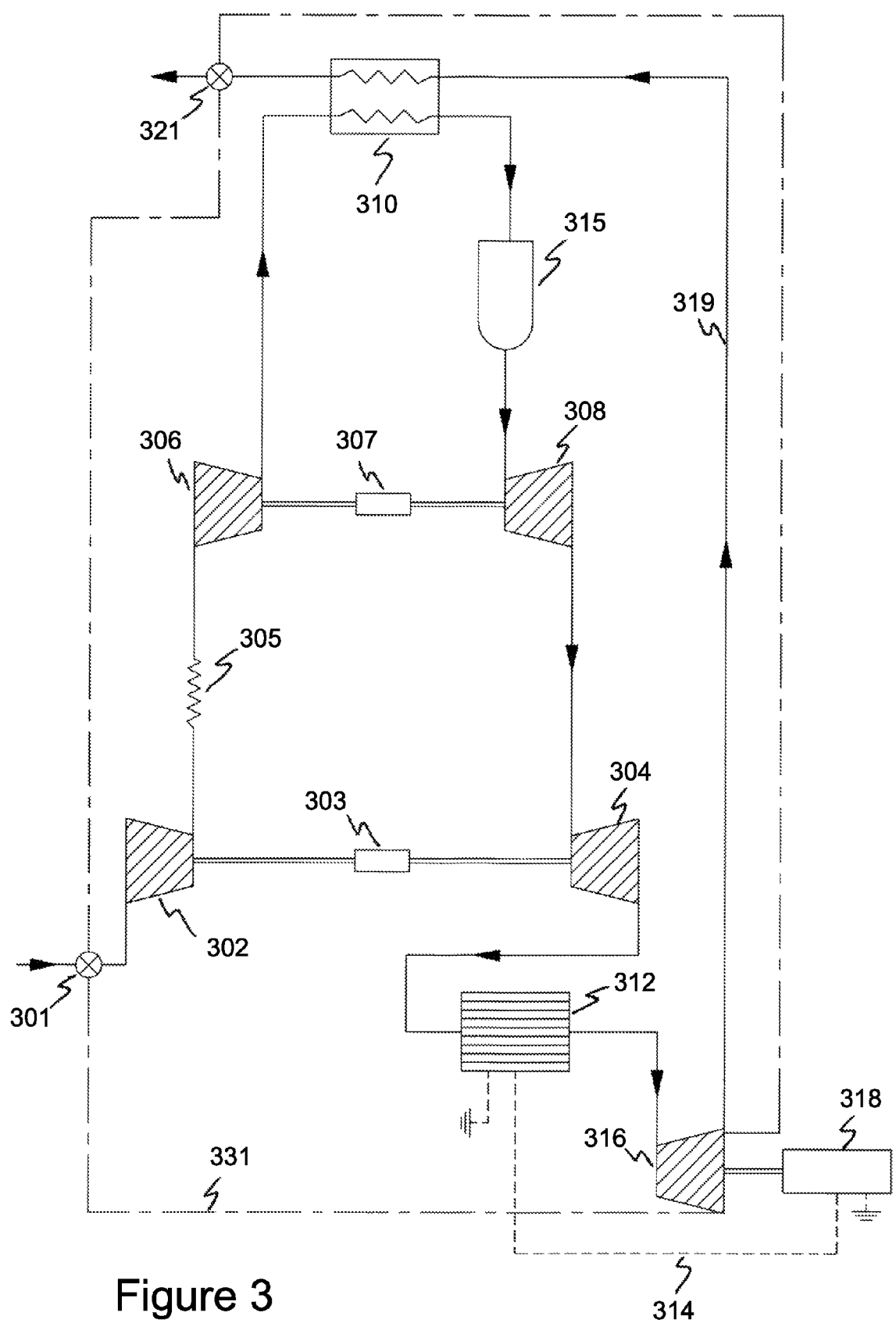
FIG. 3 is a schematic of an intercooled recuperated gas turbine cycle with reheat.

A further embodiment of the integrated resistance-heated thermal storage system is shown in FIG. 3. As in FIG. 1, conduits, such as conduit 319, connecting the various components are denoted by solid lines, the electrical conductors, such as conductor 314, are denoted by dashed lines and the pressure boundary 331 is denoted by dot-dash lines. This Brayton cycle gas turbine is essentially the same as that of FIG. 2, except that the thermal storage element 312 is located between low pressure turbine 304 and free power turbine 316. By locating thermal storage element 312 as a re-heater between turbine stages, it is possible to derive thermodynamic benefits which improve overall efficiency and specific power (power/mass flow rate).

As can be appreciated, two electrically-heated thermal storage modules can be utilized in the gas turbine cycle. As an example of this configuration, one electrically-heated thermal storage module can be located upstream of the combustor (such as in FIG. 2) and a second between the low pressure and free power turbines (such as in FIG. 3). It should be obvious to one skilled in the art of gas turbine design that the principal embodied herein may be extended to include multiple electrically heated thermal storage modules, each re-heating the engine's working fluid prior to entering each of a multiplicity of turbine stages. For example, electrically-heated thermal storage modules can be located in the bypass duct (duct 211 in FIG. 2) or even the recuperator (item 210 in FIG. 2) hot side inlet manifolds. These last two locations would not require any growth in size of the engines.

Compatible Transmissions

In a gas turbine engine in the power range of up to about 700 kW, the free power turbine typically rotates in the range from about 70,000 to about 120,000 rpm. The transmission must couple the output shaft of the free power turbine to the wheels of the vehicle which rotate in the range from about zero to about 500 rpm. This is preferably accomplished by one of a number of possible electric transmissions, although a purely mechanical transmission is feasible. However, an electric transmission offers the possibility of recovering some of the energy of braking by regenerative braking methods.

Figure 4:
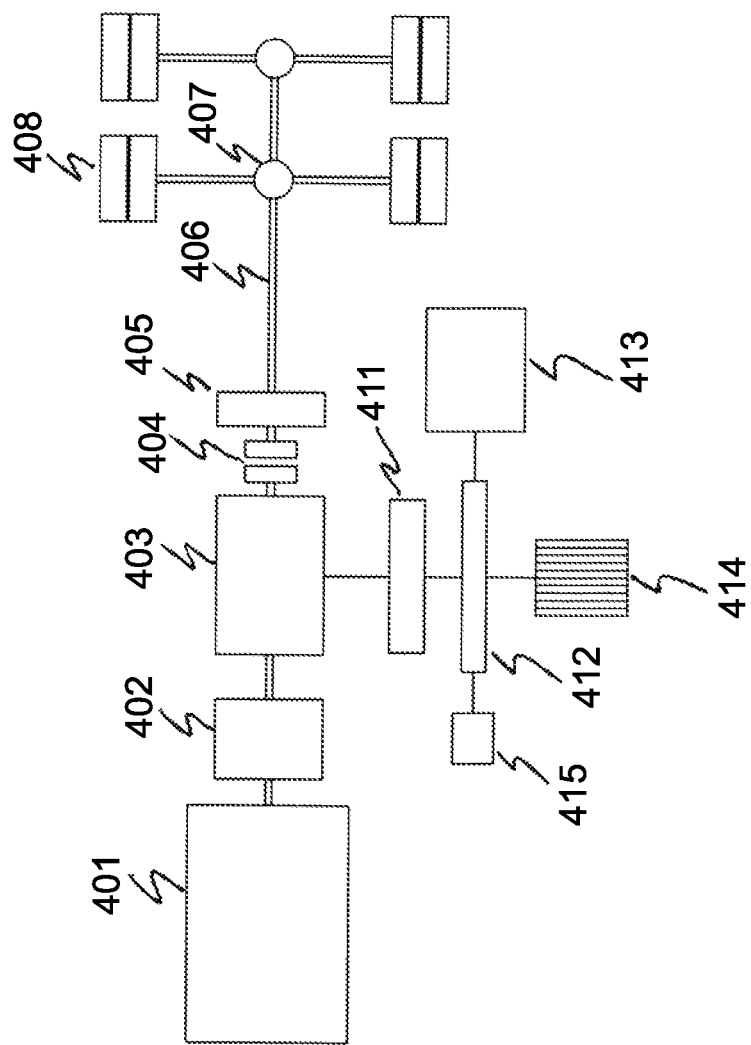
FIG. 4 is a schematic of an electric transmission suitable for regenerative braking with a gas turbine engine.

FIG. 4 is a schematic of a possible electric transmission suitable for regenerative braking with a gas turbine engine. A free power turbine 401 is shown with its output shaft connected to a reduction gearset 402 which might have a reducing gear ratio in the range of about 6:1 to about 10:1. In this example, gearset 402 is connected to traction motor 403 which can transmit mechanical shaft power via a clutch assembly 404 to a second gearset 405. Gearset 405 reduces the rpms of the transmission and might have a reducing gear ratio in the range of about 4:1 to about 10:1. Gearset 405 is connected to drive shaft 406, which is turn connected to differentials 407 which drive wheels 408. Traction motor 403 is electrically connected to a DC bus 412 by inverter 411. Vehicle auxiliary power 415, an electrical energy storage system 413 and a resistive heating element 414 are shown connected to DC bus 412. The electrical energy storage system 413 may be a battery pack, a capacitor bank or a flywheel apparatus, for example. The resistive heating element 414 may be a dissipative resistive grid (in which heat energy is removed by convection and discarded to ambient air) or a resistance-heated thermal storage system (in which heat energy is utilized such as described in FIGS. 1 through 3).

In motoring mode, electrical energy from electrical energy storage system 413 may be used to provide some or all of the propulsive power for the vehicle via traction motor 403. In braking mode, traction motor 403 becomes an electrical generator and can charge the energy storage system 413 or be dissipated in resistive dissipative grid 414 or both. For example, during braking, electrical energy derived from regenerative braking could be first directed to charge a battery pack. Once the battery pack is fully charged, electrical energy may be re-directed to a resistance-heated thermal storage system such as described in FIGS. 6 through 12. If additional dynamic braking is required and the battery pack is fully charged and the resistance-heated thermal storage system is at peak temperature, then additional electrical energy may be re-directed to the dissipative resistive grid in which heat energy is removed by convection and discarded to ambient air. Clutch assembly 404 allows the rotor of the traction motor to be disengaged during high speed motoring to reduce windage losses while engaging a separate shaft that continues to transmit mechanical power through the traction motor.

A traction motor is a mechanical-to-electrical energy conversion device used primarily for propulsion. Examples of traction motors include but are not limited to AC or DC induction motors, permanent magnet machines and a switched reluctance generators.

Figure 5:
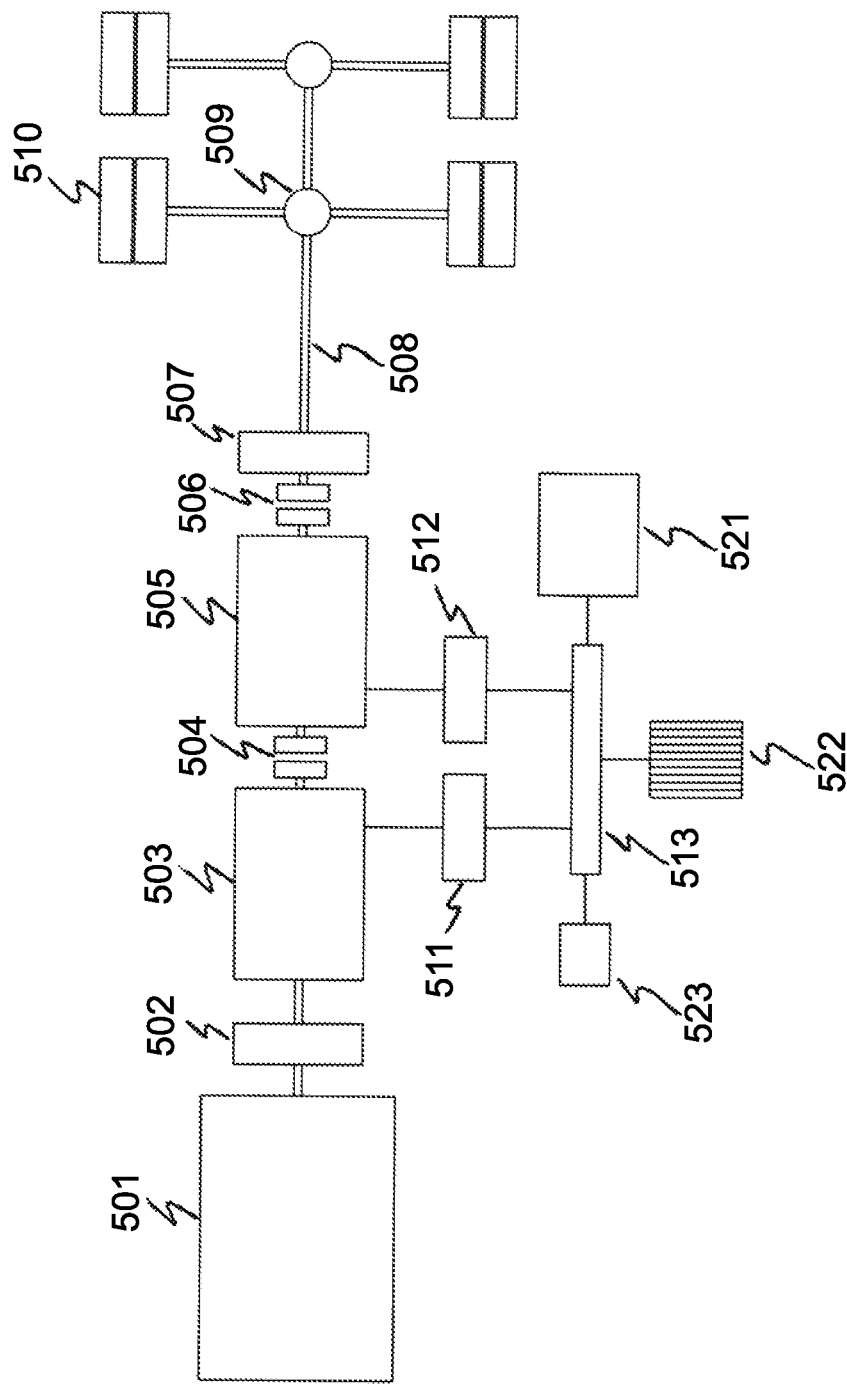
FIG. 5 is a schematic of an alternate electric transmission suitable for regenerative braking with a gas turbine engine.

FIG. 5 is a schematic of an alternate electric transmission suitable for regenerative braking with a gas turbine engine. This configuration is similar to that of FIG. 4 except there is a high speed alternator and a traction motor which can be operated electrically or mechanically depending on vehicle speed. A free power turbine 501 is shown with its output shaft connected to a reduction gearset 502 which might have a reducing gear ratio in the range of about 6:1 to about 10:1. In this example, gearset 502 is connected to alternator 503 which can output mechanical shaft power to a clutch assembly 504. When engaged, clutch assembly 504 connects alternator 503 to traction motor 505. Traction motor 505 can output mechanical shaft power via a clutch assembly 506 to a second gearset 507. Gearset 507 reduces the rpms of the transmission and might have a reducing gear ratio in the range of about 4:1 to about 10:1. Gearset 507 is connected to drive shaft 508, which is turn connected to differentials 509 which drive wheels 510. Alternator 503 and traction motor 505 are both electrically connected to a DC bus 513 by their respective inverters 511 and 512. Vehicle auxiliary power 523, an electrical energy storage system 521 and a resistive heating element 522 are shown connected to DC bus 513. The electrical energy storage system 521 may be a battery pack, a capacitor bank or a flywheel apparatus, for example. The resistive heating element 522 may be a dissipative resistive grid (in which heat energy is removed by convection and discarded to ambient air) or a resistance-heated thermal storage system (in which heat energy is utilized such as described in FIGS. 6 through 12).

In low speed motoring mode with clutch assembly 504 disengaged, electrical energy from alternator 503 and/or electrical energy storage system 521 may be used to provide propulsive power electrically for the vehicle via traction motor 505. In high speed motoring mode with clutch assembly 504 engaged, propulsive power may be provided mechanically via the shafts of alternator 503 and traction motor 505 which are locked together. Clutch assemblies 504 and 506 also allow the rotors of alternator 503 and traction motor 505 to be disengaged during high speed motoring to reduce windage losses while engaging a separate shaft that continues to transmit mechanical power through the alternator and traction motor which are locked together mechanically. The efficiency of the transmission in high speed motoring mode is typically higher (about 96% to about 98%) than the efficiency of the transmission in low speed motoring mode (about 92% to about 96%). High speed motoring mode is typically utilized for long distance driving where a higher transmission efficiency has its maximum efficiency benefit.

In braking mode with clutch assembly 504 may remain disengaged while clutch assembly 506 re-engages the rotor of traction motor 505. Traction motor 505 becomes an electrical generator and can charge the energy storage system 521 or be dissipated in resistive dissipative grid 522 or both. For example, during braking, electrical energy derived from regenerative braking could be directed first to charge a battery pack. Once the battery pack is fully charged, electrical energy may be re-directed to a resistance-heated thermal storage system such as described in FIGS. 6 through 12. If additional dynamic braking is required and the battery pack is fully charged and the resistance-heated thermal storage system is at peak temperature, then additional electrical energy may be re-directed to the dissipative resistive grid in which heat energy is removed by convection and discarded to ambient air. As can be appreciated, during braking, clutch assembly 504 may also be re-engaged to allow the rotor of alternator 503 to allow it become an electrical generator and can charge the energy storage system 521 or be dissipated in resistive dissipative grid 522 or both.

An alternator is a mechanical-to-electrical energy conversion device. Examples include but are not limited to a synchronous alternator such as a wound rotor alternator or a permanent magnet machine, an asynchronous alternator such as an induction alternator, a DC generator, and a switched reluctance generator.

The drive trains shown in FIGS. 4 and 5 are known. These drive trains are examples of electric or hybrid transmissions which may be used in gas turbine engines to provide electrical power during motoring and braking and therefore provide the gas turbine engine a dynamic braking capability. The electrical energy generated during dynamic braking may be dissipated or it may be used to return heat energy to the engine as described in FIGS. 1 through 3 and FIGS. 6 through 12.

Various Embodiments of Thermal Energy Storage Modules

The principle of the electrically heated thermal storage module is described in FIG. 6. In FIG. 6a, conduit 601 confines the pressurized working fluid to flow between two engine components such as in FIG. 1, 2 or 3. Electrode feedthrough 603 permits the electrical connection to be made through the pressure boundary and communicate with the resistively heated elements 602. An electrical ground 604 is required to complete the electrical circuit through the heating elements. As shown in the cross-section of FIG. 6b, the resistive elements within conduit 611 may be a wire grid 612. Alternately, as shown in the cross-section of FIG. 6c, the resistive elements within conduit 612 may be a wire or ceramic matrix 622. If a ceramic matrix is used, resistive conductors such as Kanthal or tungsten would be embedded in the ceramic elements. As shown in FIG. 6a, working fluid 605 enters the conduit at end 606 and exits the conduit at end 607. This working fluid is commonly air, but may be another gas, such as helium, nitrogen, argon, or xenon, or other gas or gas combination employed in open or closed cycle gas turbines (for example, a fuel-air mixture). The resistor wire or matrix elements are positioned within the gas turbine conduit to achieve high convective heat exchange between the fluid and the heating element while leaving sufficient flow cross-sectional area to maintain a selected pressure drop through the thermal energy storage module.

Figure 7:
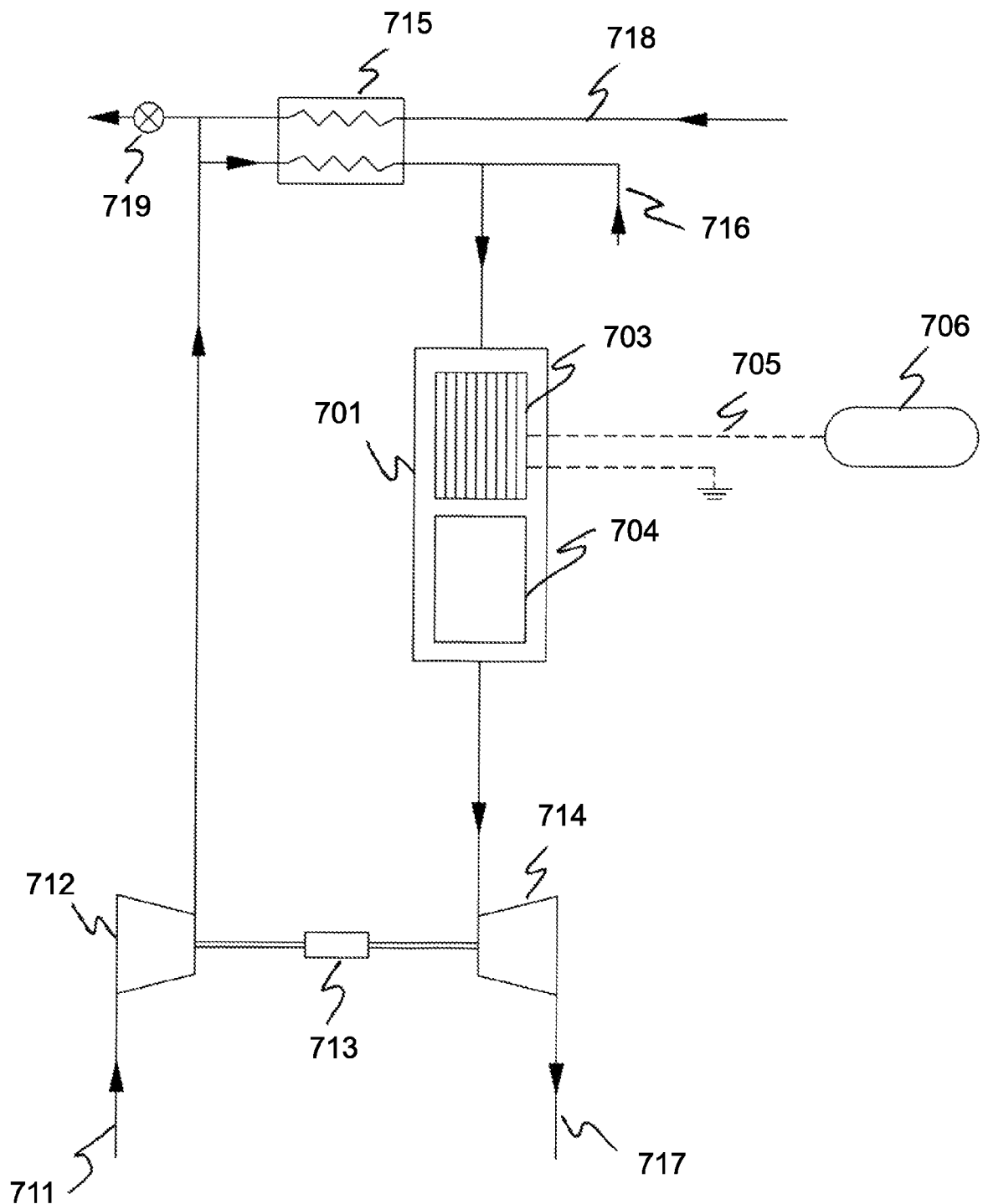
FIG. 7 is a schematic of an electrically heated thermal storage module representation with surface combustion thermal reactor.

As shown in FIG. 7, another configuration for utilizing an electrically activated thermal storage module combines the principals described above with a combustion system. In a typical application wherein the gas turbine working fluid is air and a compressor 712 delivers air to a combustor assembly 701. Commonly a recuperator 715 may also be employed as an energy savings device, but un-recuperated variations are equally feasible. In the example of FIG. 7, combustor vessel 701 contains an electrically heated thermal storage module 703, arranged as described in FIG. 6 to serve as an effective heat exchanger, and a combustor unit 704. The combustor 704 may be a conventional metallic combustor or it may be a ceramic matrix combustor. In the configuration illustrated in FIG. 7, gaseous or vaporized fuel is introduced from conduit 716, preferably upstream of the combustor assembly 701. When thermal storage module 703 is not operating, the pre-mixed fuel and air passing through the combustor 704 is reacted. If combustor 704 is a ceramic matrix combustor, the pre-mixed fuel and air passing through matrix will react on the high temperature surfaces, releasing the heat of combustion. This ceramic matrix reactor has certain advantages in a gas turbine combustor, providing very low pressure drop, low levels of NOx emissions, an a homogenous temperature distribution to the flow entering the turbine section down-stream.

The use of an electrically heated thermal storage system provides a convenient means of controlling the conditions of the reaction of a lean fuel-air in a ceramic matrix combustor.

It was noted previously that a battery or other electrical energy storage device may be used to heat the thermal storage element to assist in engine start-up. That is, a thermal energy storage element, located for example just upstream of the combustor, can be used to add heat to the working fluid to assist an engine starter device for a gas turbine engine used in a vehicle. Such a starter device has been disclosed in U.S. patent application Ser. No. 12/115,134 entitled "Multi-Spool Intercooled Recuperated Gas Turbine".

Finally, it should be obvious to one skilled in the art of gas turbine design that the aforementioned invention would function equally well as an inter-turbine re-heater, as illustrated, for example, in FIG. 3.

Figure 8:
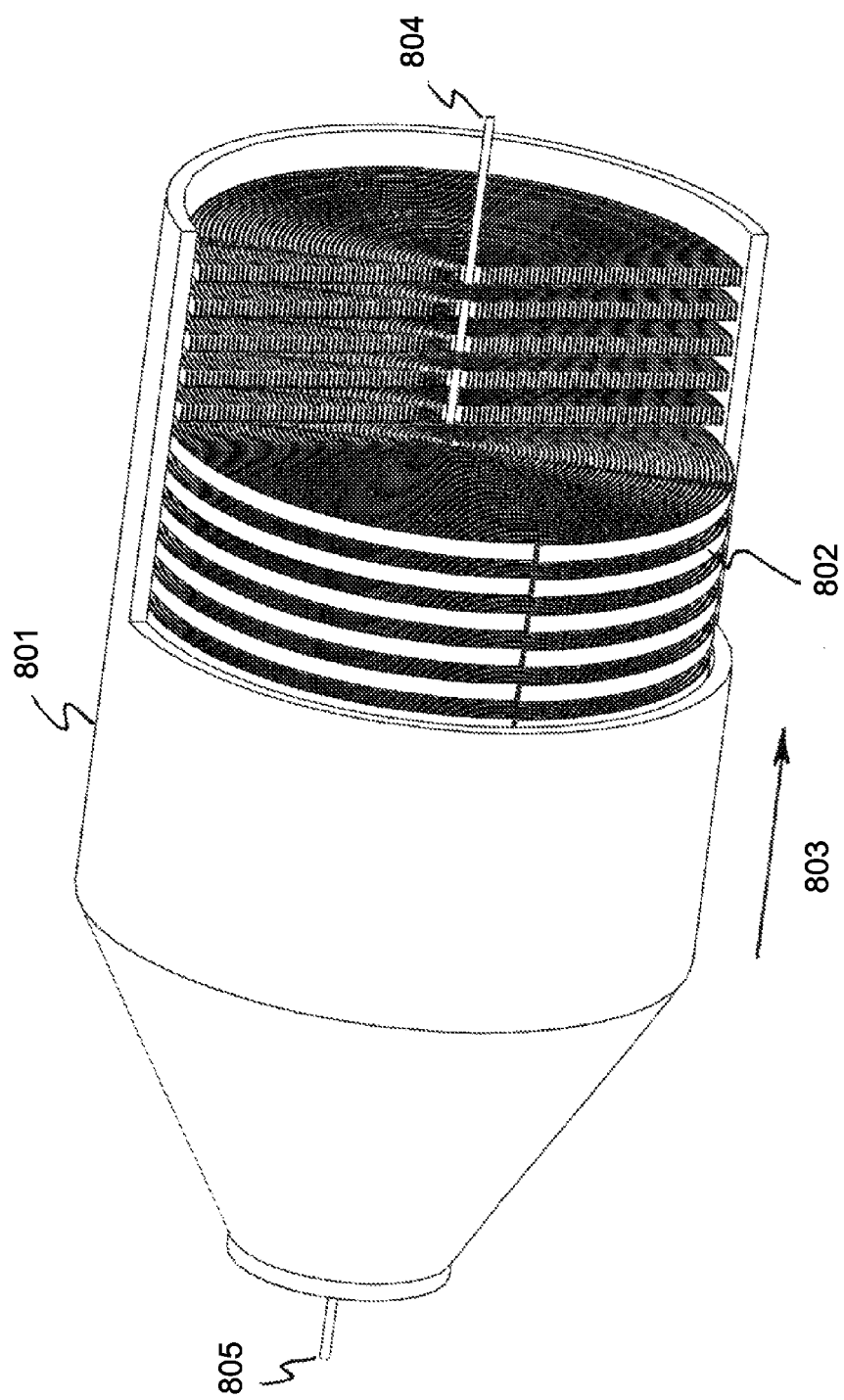
FIG. 8 is an isometric view of a first configuration of a thermal energy storage module.

FIG. 8 is an isometric view with a cutaway section of a first configuration of a thermal energy storage module. The module casing 801 contains a metallic heating element 802. Electrical energy flows in via conductor 804, through each Kanthal spiral and out via conductor 805. The flow direction of the gas turbine working gas is indicated by arrow 803. Heating element 803 can be made of a material such as, for example, Kanthal A1 which is a material commonly used in automobile cigarette lighters. The module shown in FIG. 8 is about 0.33 meters in diameter with a cylindrical section about 0.4 meters long. The Kanthal heat storage element is formed by 18 spirals joined together, each about 10 mm wide by about 1.0 mm thick by about 17 meters long for a total length of Kanthal of about 306 meters. The Kantal spirals are all connected in series to form a single long resistive element. The connections are shown as alternately at the center of each spiral then at the outside of adjacent spirals. At maximum working temperature of about 1,670 K to about 1,700 K, the storage module which weighs about 15 kg can store about 5 to 6 MJ in the form of useable heat energy. The spirals are separated by an air gap of about 3 to 10 mm.

Figure 9A:
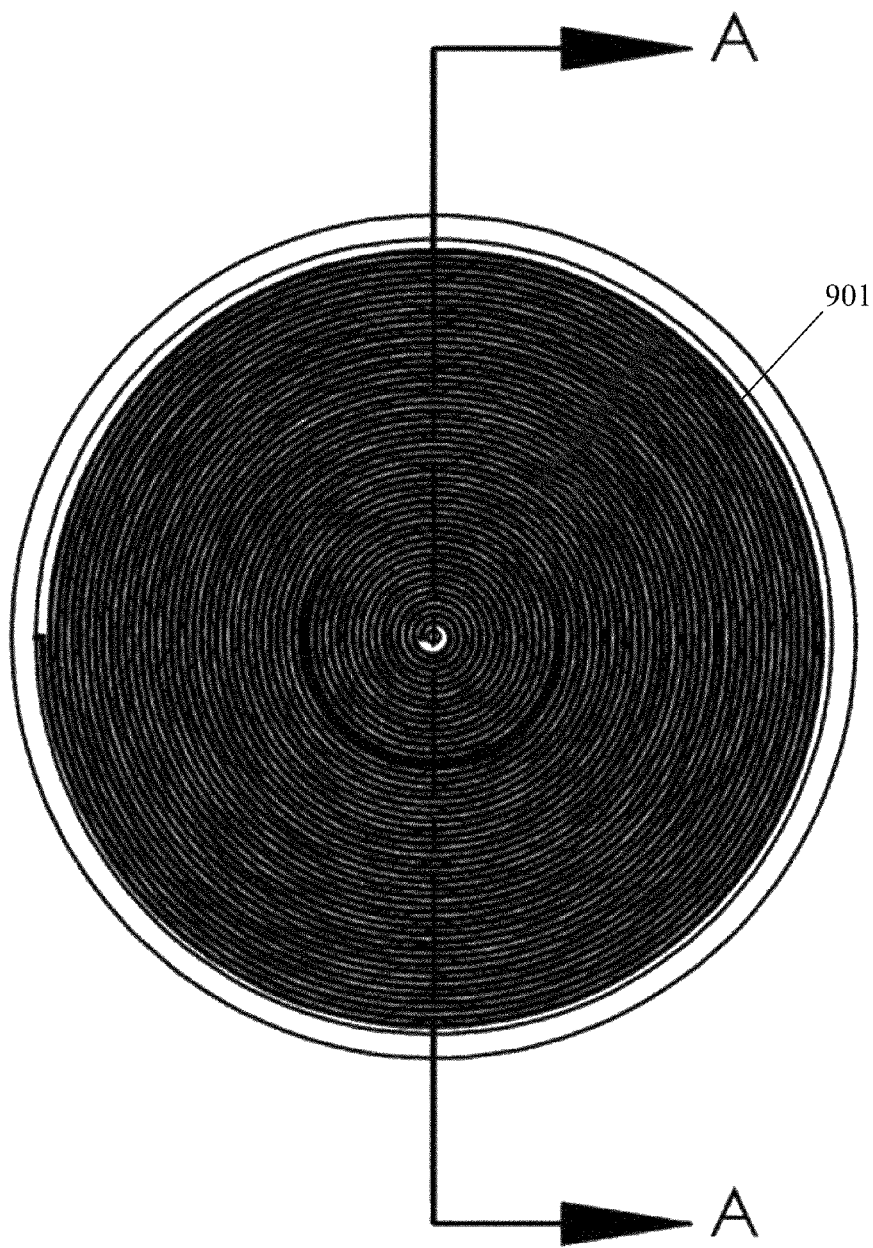
FIG. 9a shows an end view of the thermal energy storage module of FIG. 8.
Figure 9B:
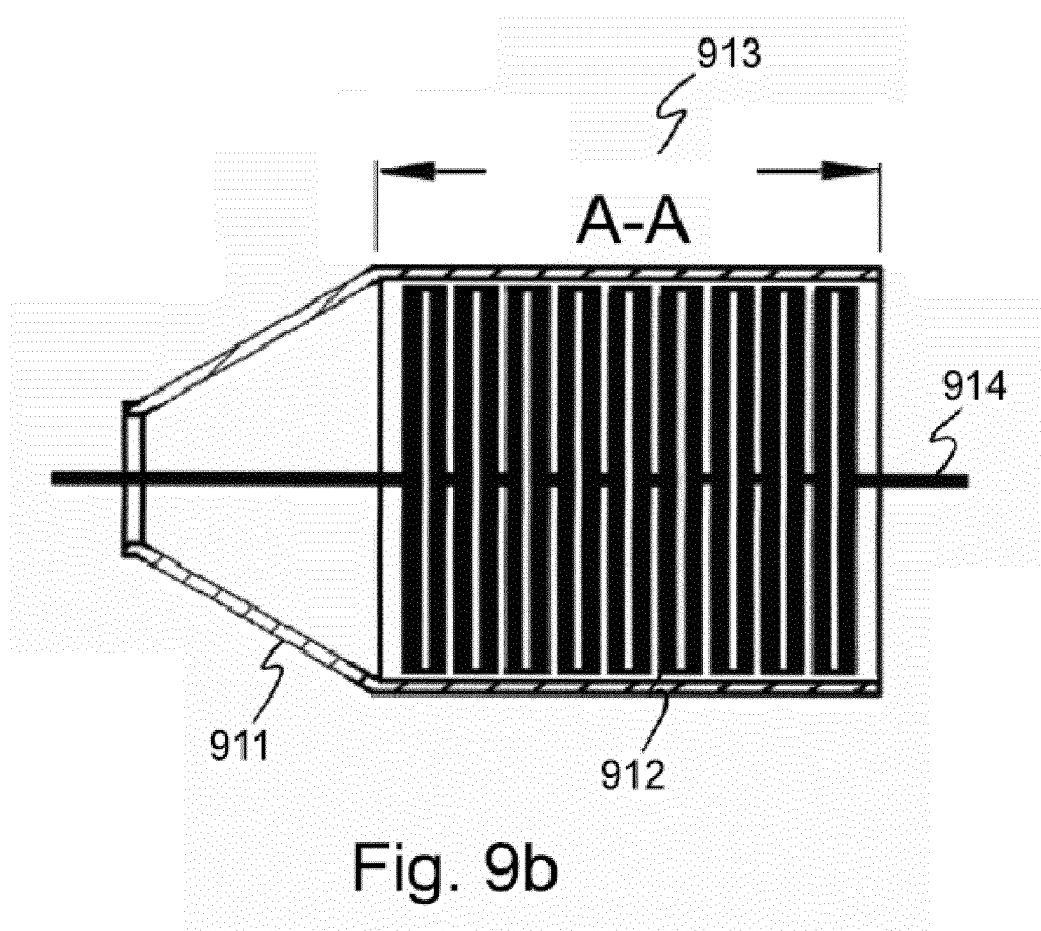
FIG. 9b is a sectional view along line A-A of FIG. 9a of the thermal energy storage module representation of FIG. 8.
Figure 9C:
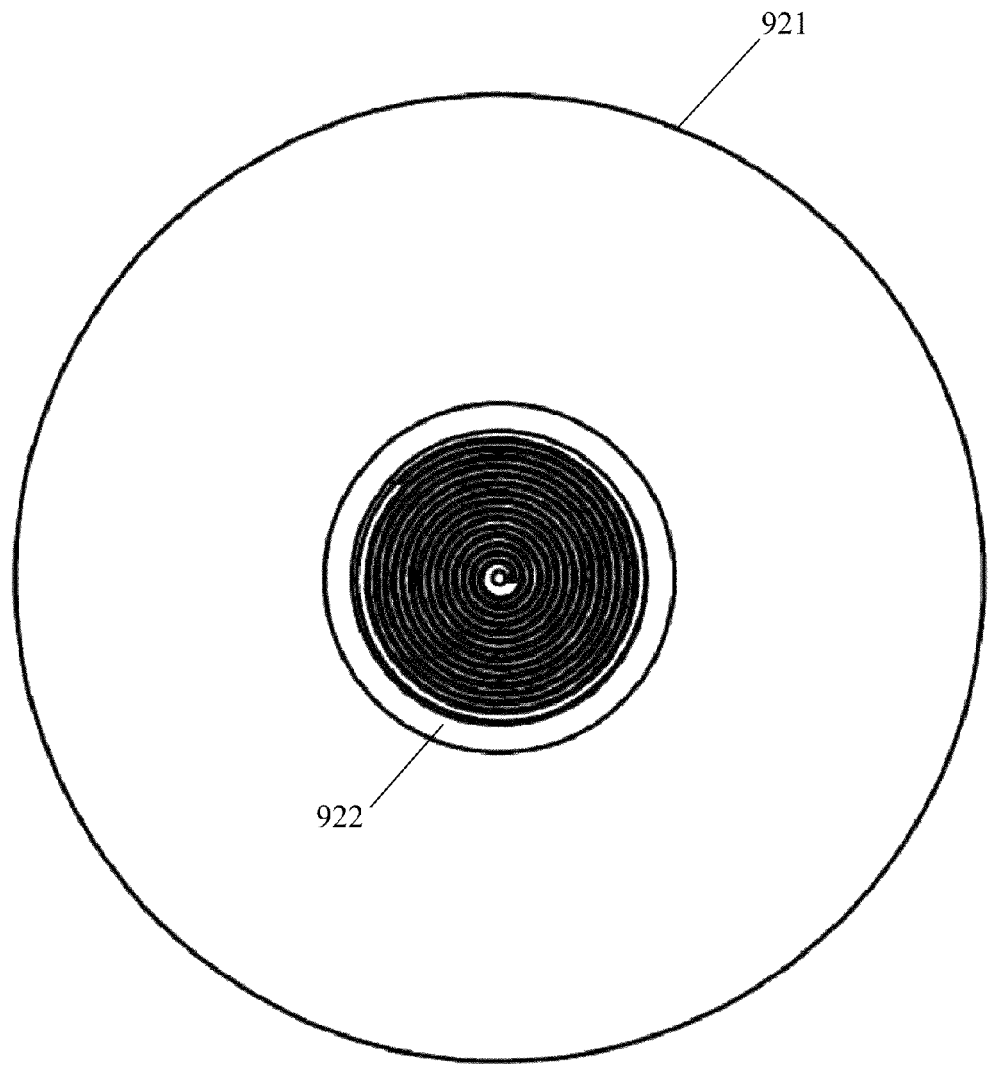
FIG. 9c is an end view of the energy storage module representation of FIG. 8.

FIGS. 9a-c show various views of the thermal energy storage module of FIG. 8. This thermal energy storage module is designed for a gas turbine engine with an approximate peak power of 375 kW. The 15 kg Kanthal thermal strip, configured as a series of spiral windings, is housed in an approximately 0.334 meter diameter steel housing 901 with a wall thickness in the range of about 9.5 to about 11 mm. The cylindrical portion of the housing 911 is about 0.395 meters long and tapers down from about a 0.334 meter diameter at about 30 degrees to about a 0.12 meter diameter 922.

Figure 10:
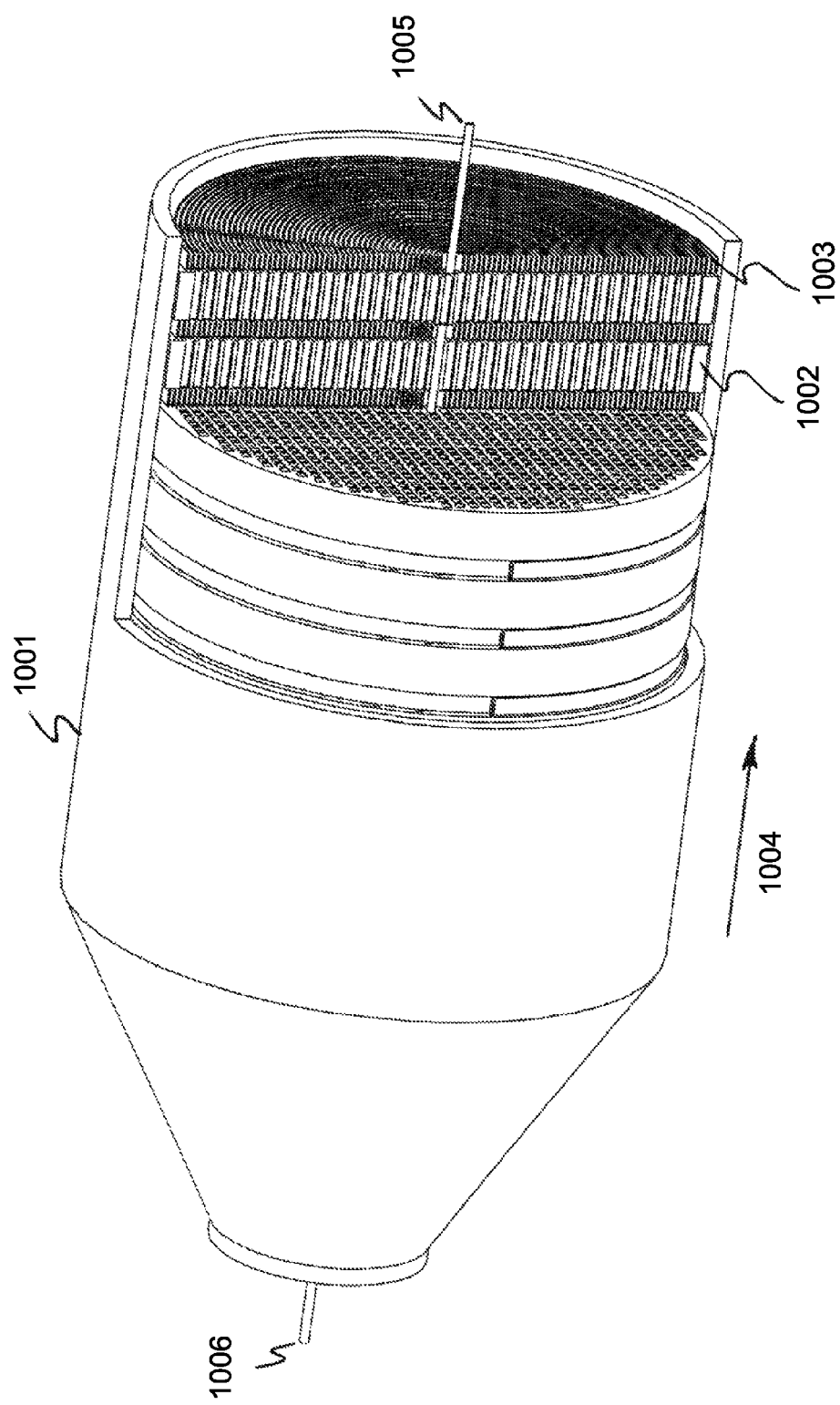
FIG. 10 is an isometric view of a second configuration of a thermal energy storage module.
Figure 11:
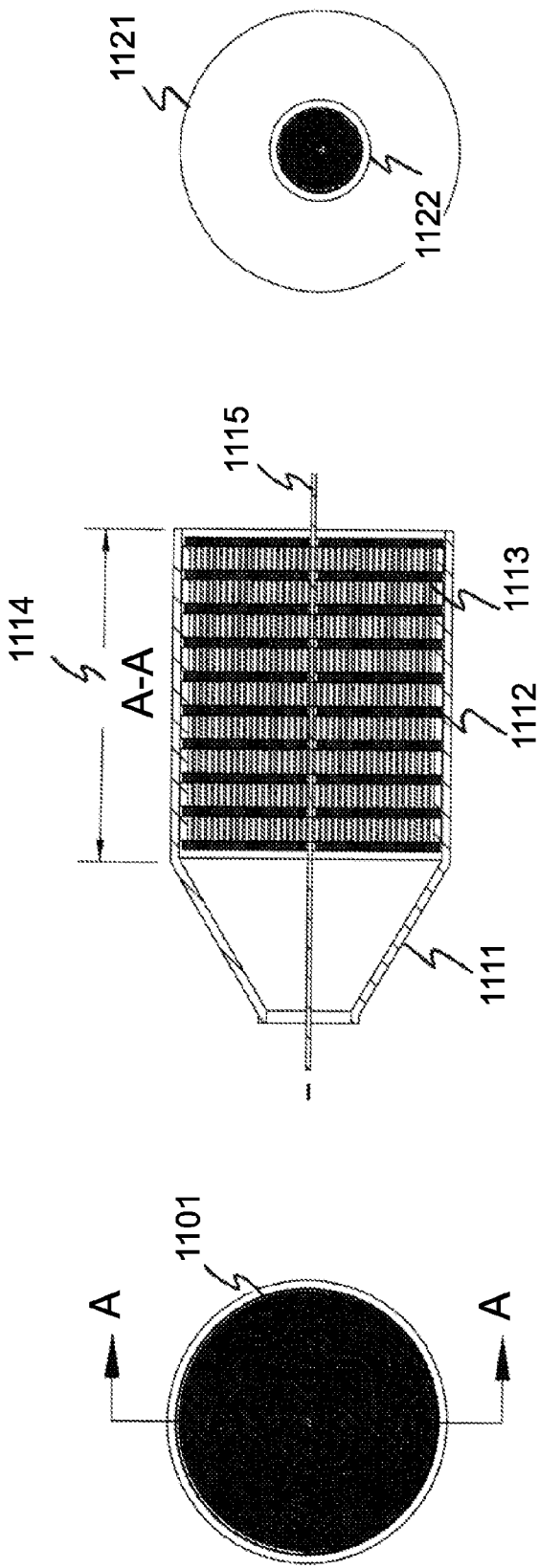
FIG. 11a shows an end view of the thermal energy storage module of FIG. 10.
FIG. 11b is a sectional view along A-A of FIG. 11a of the thermal energy storage module representation of FIG. 10.
FIG. 11c is an end view of the energy storage module representation of FIG. 10.

FIG. 10 is an isometric view with a cutaway section of a second configuration of a thermal energy storage module. The module casing 1001 contains a heating element 1003. Heating element spirals 1003 contained within housing 1001 are interspersed with ceramic honeycomb discs 1002 to increase the thermal mass of the module while reducing the overall module mass. Ceramic honeycomb discs 1002 may be made of alumina or silicon carbide, for example. Electrical energy flows in via conductor 1005, through each Kanthal spiral and out via conductor 1006. The flow direction of the gas turbine working gas is indicated by arrow 1004. For example, the heating element 1003 is made of a material such as Kanthal A1 which is a material commonly used in automobile cigarette lighters. The module shown in FIG. 10 is about 0.33 meters in diameter with a cylindrical section about 0.4 meters long. The Kanthal heat storage element is formed by a number of spirals joined together, each about 10 mm wide by about 1.0 mm thick by about 17 meters long for a total length of Kanthal of about 150 meters. As in FIG. 8, the Kantal spirals are all connected in series to form a single long resistive element. The connections are shown as alternately at the center of each spiral then at the outside of adjacent spirals. At maximum working temperature of about 1,670 K to about 1,700 K, the storage module which weighs about 15 kg can store about 5 to 6 MJ in the form of useable heat energy. The metallic spirals are separated by ceramic layers which range from about 5 mm to about 30 mm wide. As can be appreciated, the ratio of metallic strip width to ceramic strip width can be varied to change the ratio of active heating element storage capacity to passive thermal storage capacity and to adjust the overall weight of the thermal storage module.

FIGS. 11a-c show various views of the thermal energy storage module of FIG. 10. This thermal energy storage module is designed for a gas turbine engine with an approximate peak power of 375 kW. A 7 kg Kanthal thermal strip is housed in a 0.334 meter diameter steel housing 1111 with a wall thickness in the range of about 9.5 to about 11 mm. The cylindrical portion of the housing 1111 is about 0.395 meters long and tapers down from about a 0.334 meter diameter at about 30 degrees to about a 0.12 meter diameter 1122.

Figure 12:
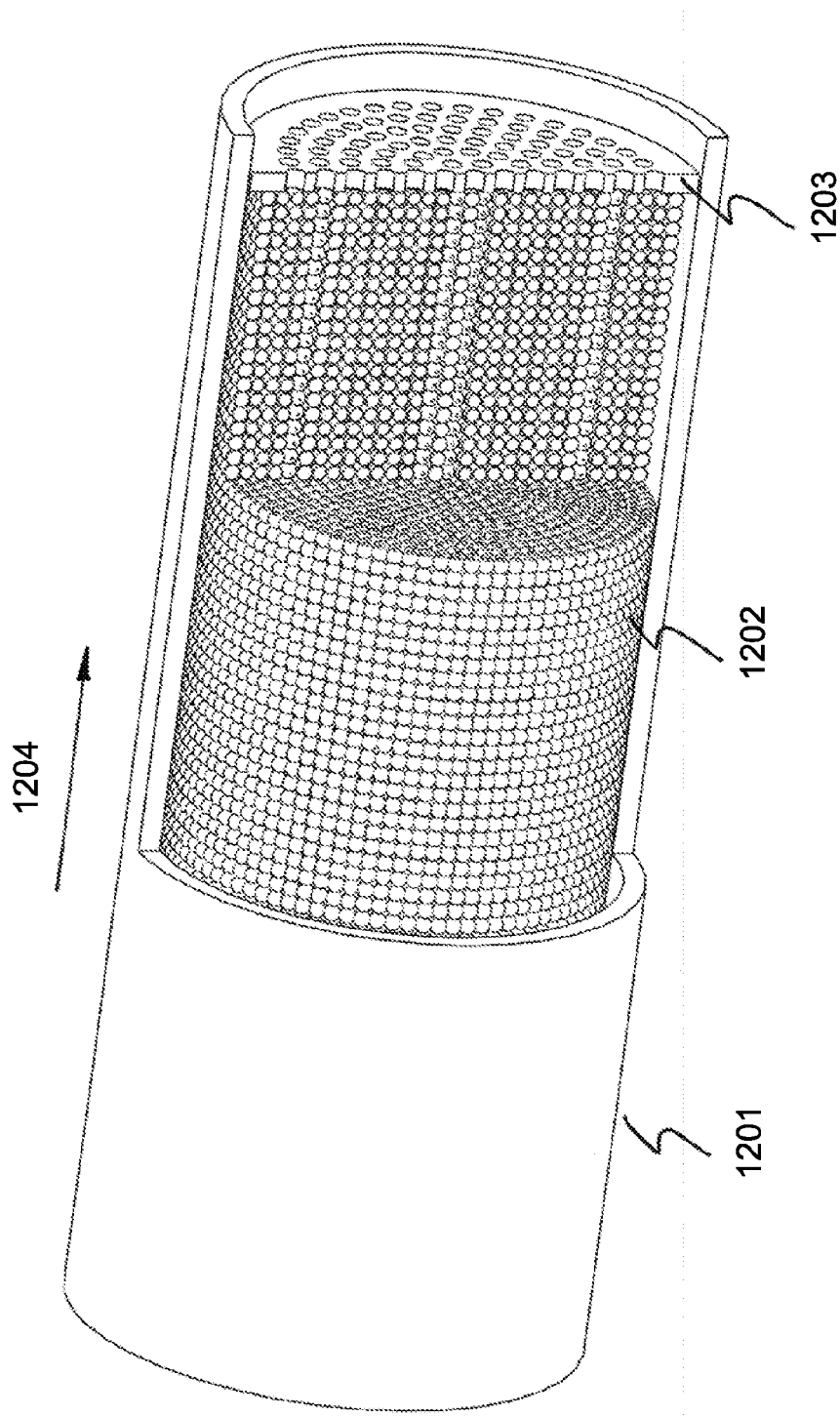
FIG. 12 is an isometric view of a third configuration of a thermal energy storage module.

FIG. 12 is an isometric view with a cutaway section of a third configuration of a thermal energy storage module. This thermal energy storage module is also designed for a gas turbine engine with an approximate peak power rating of about 375 kW. In this configuration, the thermal storage is formed by a porous metal pebble bed in a metallic pellet configuration. Higher resistance sintered Kanthal metal pellets 1202 are held between lower resistance bonded metal conductor end caps 1203 at both ends, all contained in cylindrical housing 1201. Metal conductor end caps 1203 are preferably made from lower resistance Kanthal. The void fraction (air cross-section to solid material cross-section) is adjusted for a selected, tolerable low pressure drop and compact size.

FIGS. 13a-b show various views of the thermal energy storage module of FIG. 12. As shown in FIG. 13a, the diameter of housing 1301 is about 0.1684 meters in diameter with the sintered Kanthal bed contained inside. As shown in FIG. 13b, the cylindrical housing 1311 is about 0.368 meters long with electrically positive end cap 1314 and electrically negative (ground) end cap 1315.

Sizing of Electrically Heated Thermal Storage Module

As an example, electrical energy recovered from braking for a 375 kW gas turbine engine is assumed to be recovered at a rate of about 200 kWe from the braking electrical generator system. If this system is operated for about 30 seconds, the total energy recovered is about 6 MJ, which is typical of a short descent down a modest hill. This performance is typical of a thermal energy storage system of about 15 kg of Kanthal coiled into a 1 mm thick by 10 mm wide by 306 meter long spiral structure located between the recuperator and combustor as shown in FIG. 2. Such a structure is shown, for example, in FIG. 8.

The maximum energy stored is the mass of the thermal storage element times its average heat capacity times the temperature change and is typically about 6 MJ for the size of engine assumed. The total energy input to the thermal storage element may be larger than 6 MJ as the working fluid flow through the thermal storage element simultaneously removes heat during the charging cycle. For materials such as Kanthal, the maximum useful energy storage capacity is about 0.3 to about 0.4 MJ/kg. Thus a 15 kg Kanthal heat storage module will store about 6 MJ. More energy than this (approximately 20% to about 50% depending on the design of the thermal storage element) can be received from the braking system as some energy is simultaneously transferred out of the thermal storage element by convection to the air flow through the thermal storage module during charging.

If the mass of the element is 15 kg and the density of the thermal storage element material is about 7,100 kg per cubic meter, the approximate volume of Kanthal is about 0.002 cubic meters. The fill factor is about 15% to about 30% Kanthal with the remainder being volume available for the flow of working fluid. Thus, the overall volume of a thermal storage module is on the order of 0.01 cubic meters. The reduction in flow volume by the thermal storage element causes a pressure drop. It is desired to minimize this pressure drop while maximizing the convective heat transfer surface area. The design problems related to these considerations are discussed in FIG. 14.

At full engine power, the initial flow conditions over the Kanthal are typically about 1.2 kg/s at about 8 m/s and flow density of about 6.5 kg/m3 (corresponding to inlet conditions of about 1,450 kPa and about 775 K).

At engine idle power of about 25% full power, the initial flow conditions over the Kanthal are typically about 0.3 kg/s at about 8 m/s and flow density of 1.6 kg/m3 (corresponding to inlet conditions of about 360 kPa and about 775 K).

The convection heat transfer coefficient for the "cigarette lighter" design as shown in FIG. 8, is that characteristic of a flat plate since the flow length through the channels is too short for the flow to develop and transition to fully turbulent. The flow over the Kanthal can be approximated as initially laminar flow transitioning to turbulent flow near the end of the flat plate where the length of the flat plate assumed in the analysis is approximately the width of the Kanthal strip or about 10 mm. The average convective heat transfer coefficient ranges from about 200 to about 400 W/sq m-K over operating flow conditions. In this example, the active convective heat transfer area is about 6 square meters (10 mm wide strips, about 306 meters long, both sides). The energy transfer out of the heat storage module to the flow occurs at about 75 kW or about 35% of the electrical power input to the thermal storage element.

In a calculation typical of a 375 kW gas turbine engine at idle power during braking and charging of the thermal storage module, flow temperature and pressure at the entry to the thermal storage module are about 360 kPa and about 775 K and the thermal storage element is at about 775 K. After about 36 seconds of 200 kWe braking, the temperature of the Kanthal from front to back of the thermal storage module is approximately constant at about 1,000 K while the air flow temperature ranges from about 780 K at the entry to about 920 K at the exit. After about 60 seconds of 200 kWe braking, the temperature of the Kanthal from front to back of the thermal storage module ranges from about 1,500 K at the entry to about 1,750 K at the exit while the corresponding air flow temperatures range from about 780 K to about 1,310 K.

After discharging of the thermal storage module for about 28 additional seconds (or about 88 seconds after the start of braking), the temperature of the Kanthal from front to back of the thermal storage module ranges from about 1,045 K at the entry to about 1,370 K at the exit while the corresponding air flow temperatures range from about 780 K to about 1,060 K. From these calculations, it can be seen that the thermal storage module raises inlet temperature to the combustor to nearly the desired combustor outlet temperature so that very little fuel is required to achieve the desired combustor outlet temperature, thus resulting in a reduction of fuel consumption.

Control of Braking Energy

Figure 14:
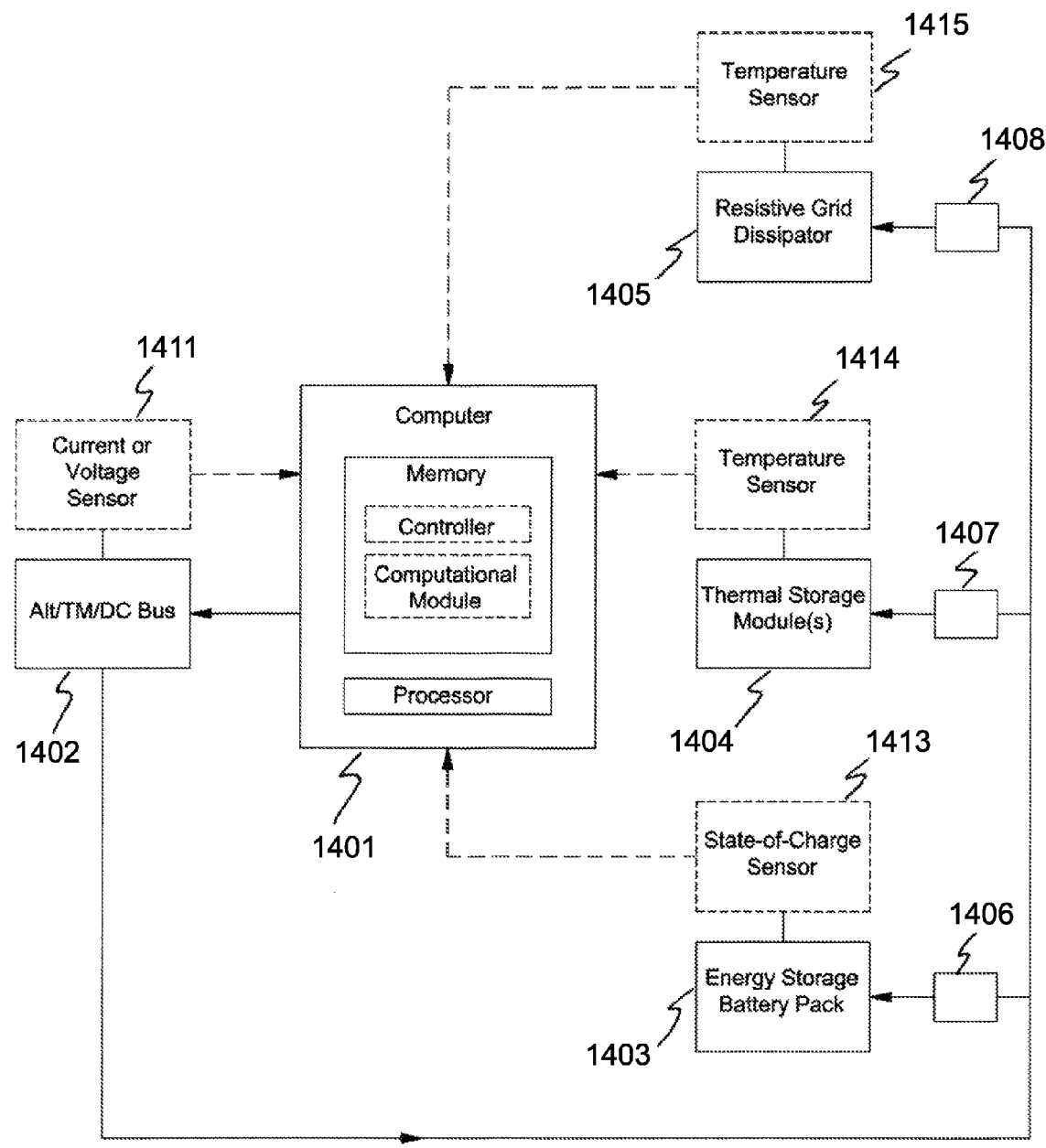
FIG. 14 is a schematic of a regenerative braking energy distribution control system for a gas turbine with at least one thermal energy storage module.

FIG. 14 is a schematic of a regenerative braking energy distribution control system for a gas turbine powered vehicle with at least one thermal energy storage module. This figure shows a computer 1401 in communication with electrical components 1402 of a drive train such as shown in FIGS. 4 and 5. Computer 1401 is also in communication with one or more energy storage systems 1403, one or more thermal storage modules 1404 and a resistive grid 1405 that can dissipate its thermal energy to ambient air. Examples of electrical energy storage systems 1403 are battery packs, capacitor banks or flywheels. Thermal storage modules 1404 are those shown, for example, in FIGS. 8 through 13 which convert electrical energy to thermal energy by Joule heating within the pressure boundary of a gas turbine engine. An example of a resistive grid 1405 is the roof-mounted resistive braking grid typically used for dynamic braking of locomotives.

As shown in FIG. 14, choppers 1406, 1407 and 1408 are included and may be used as on/off switches and current regulators to the energy storage pack 1403, thermal storage module(s) 1404 and resistive dissipater grid 1405 respectively. These choppers may be controlled by the controller in computer 1401. This is a known method of control for energy storage packs and resistive dissipater grids.

In the design of a thermal storage module, it is desired to prescribe both the volume and surface area of the resistive storage element. The volume must be adjusted to control the pressure drop of the flow through the element while the surface area must be adjusted to achieve the desired heat transfer rate from the element to the flow. For a given material, this design process cannot also control the electrical resistance of the storage element. Therefore, a chopper 1407 can be used to regulate the desired current flow to the storage element in module 1404 consistent with the resistance of the storage element and the voltage of the DC bus 1402. The chopper may be pulse width modulated or pulse frequency modulated. Alternatively or additionally, the voltage of the DC bus may be altered to regulate the desired current flow to the storage element.

When the vehicle is braking, the electric components 1402 of the drive train generate power to a DC bus such as described in FIGS. 4 and 5. A voltage and/or current sensor 1411 on the DC bus is monitored by computer 1401 and a controller in computer 1401 determines where to distribute the electrical power generated by dynamic braking. If energy storage system 1403 is a battery pack or capacitor bank, its state-of-charge is determined typically by a voltage sensor 1412 which is monitored by computer 1401. Any suitable voltage or current sensor may be employed. Examples of voltage sensors include voltmeters, other common voltage transducers or voltage sensing devices. Examples of current sensors include ammeters, current-sensing resistors, Hall current sensors, current-sensing transformers, current transducers, Rogowski coils or other common current measuring devices.

If the energy storage system can accept additional charge and if power is not needed by thermal energy storage module 1404, then the controller in computer 1401 directs electrical power to energy storage system 1403 until state-of-charge sensor 1412 communicates to computer 1401 that the state-of-charge of the battery pack or capacitor bank is at its selected operating (e.g., maximum) voltage. If energy storage system 1403 is a flywheel, then sensor 1413 may be an rpm indicator and addition of energy to the flywheel would be terminated by the controller of computer 1401 when rpm sensor 1412 communicates to computer 1401 that the rpm of the flywheel is at its selected operating rpm. Examples of rotary speed sensors include tachometers such as axle alternators or reluctance pickups.

If braking power is still being generated and if temperature sensor 1413 indicates that the temperature of thermal storage module 1404 is below its operating (e.g., maximum acceptable) temperature, then the controller in computer 1401 directs electrical power to thermal storage module 1404 until temperature sensor 1413 communicates to computer 1401 that the temperature of the thermal energy storage module is at its selected operating temperature.

If braking power is still being generated then the controller in computer 1401 directs electrical power to the resistive grid dissipater 1405 until temperature sensor 1414 communicates to computer 1401 that the temperature is at its selected operating (e.g., maximum) temperature. Once energy storage system 1403 has reached its operating state-of-charge and once thermal storage modules 1404 have reached their operating temperatures and once resistive grid dissipater 1405 has reached its operating (e.g., maximum) temperature, then dynamic braking is terminated and further braking is accomplished by the vehicles mechanical braking system.

If the vehicle is not braking and if power is needed by thermal energy storage module 1404, for example for assisting in engine start-up, then the controller in computer 1401 may direct electrical power electrical power to thermal storage module 1404 from energy storage system 1403 until temperature sensor 1413 communicates to computer 1401 that the temperature of the thermal energy storage module is at its selected operating temperature.

A number of variations and modifications of the inventions can be used. As will be appreciated, it would be possible to provide for some features of the inventions without providing others.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
receiving electrical energy from a regenerative braking system;
converting at least a portion of the received electrical energy into thermal energy;
transferring, directly and/or indirectly, the thermal energy to a pressurized working fluid to form a heated pressurized working fluid;
introducing the heated pressurized working fluid into at least one turbine to propel a vehicle; and
wherein the converting step is performed within a pressure boundary of a gas turbine engine.

2. The method of claim 1, wherein the regenerative braking system comprises a mechanical-to-electrical conversion device, at least one of which is a synchronous or asynchronous alternator, a generator, a permanent magnet machine, a direct current ("DC") generator, a switched reluctance machine and a traction motor, and a DC bus and further comprising:
when the vehicle brakes, engaging the mechanical-to-electrical conversion device to generate the electrical energy; and
storing the thermal energy in a heat storage element in thermal communication with the pressurized working fluid.

3. The method of claim 1, wherein the transferring step is performed between a cold side of a recuperator and a combustor.

4. The method of claim 1, wherein the transferring step is performed in a combustor.

5. The method of claim 1, wherein the transferring step is performed between a combustor and a high pressure turbine.

6. The method of claim 1, wherein the transferring step is performed between a high pressure turbine and a low pressure turbine.

7. The method of claim 1, wherein the transferring step is performed between a low pressure turbine and a free power turbine.

8. The method of claim 1, wherein the transferring step is performed upstream of a hot side of a recuperator.

9. The method of claim 2, wherein the heat storage element has the following characteristics:
a density of at least about 1,800 kg/m$^3$;
a heat capacity of at least about 400 J/kg-K; and
a melting temperature in excess of a maximum temperature in the combustor.

10. The method of claim 9, wherein the heat storage element is at least one of graphite, boron nitride, boron carbide, silicon carbide, silicon dioxide, magnesium oxide, tungsten carbide, alumina, a Kanthal alloy, and an Inconel alloy.

11. The method of claim 1, wherein, during an extended period of regenerative braking, a first portion of the pressurized working fluid is passed through a cold side of a recuperator and a second portion of the pressurized working fluid bypasses the recuperator.

12. A method, comprising:
receiving electrical energy from a regenerative braking system;
converting at least a portion of the received electrical energy into thermal energy;
transferring, directly and/or indirectly, the thermal energy to a pressurized working fluid to form a heated pressurized working fluid, wherein said transferring is performed between a cold side of a recuperator and a combustor; and
introducing the heated pressurized working fluid into at least one turbine to propel a vehicle.

13. A method, comprising:
receiving electrical energy from a regenerative braking system;
converting at least a portion of the received electrical energy into thermal energy;
transferring, directly and/or indirectly, the thermal energy to a pressurized working fluid to form a heated pressurized working fluid;
introducing the heated pressurized working fluid into at least one turbine to propel a vehicle;
wherein the regenerative braking system comprises a mechanical-to-electrical conversion device, which is at least one of a synchronous or asynchronous alternator, a generator, a permanent magnet machine, a direct current ("DC") generator, a switched reluctance machine, and a traction motor, and a DC bus and further comprising:
when the vehicle brakes, engaging the mechanical-to-electrical conversion device to generate the electrical energy, and
storing the thermal energy in a heat storage element in thermal communication with the pressurized working fluid; and
wherein the heat storage element has the following characteristics:
a density of at least about 1,800 kg/m$^3$,
a heat capacity of at least about 400 J/kg-K, and
a melting temperature in excess of a maximum temperature in the combustor.

14. The method of claim 13, wherein the heat storage element is at least one of graphite, boron nitride, boron carbide, silicon carbide, silicon dioxide, magnesium oxide, tungsten carbide, alumina, a Kanthal alloy, and an Inconel alloy.

15. A method, comprising:
receiving electrical energy from a regenerative braking system;
converting at least a portion of the received electrical energy into thermal energy;
transferring, directly and/or indirectly, the thermal energy to a pressurized working fluid to form a heated pressurized working fluid;
introducing the heated pressurized working fluid into at least one turbine to propel a vehicle; and
wherein, during an extended period of regenerative braking, a first portion of the pressurized working fluid is passed through a cold side of a recuperator and a second portion of the pressurized working fluid bypasses the recuperator.

* * * * *